US012698405B2

(12) United States Patent
Webster et al.

(10) Patent No.: US 12,698,405 B2
(45) Date of Patent: Aug. 4, 2026

(54) AMPHIPHILIC SILOXANE-POLYURETHANE FOULING-RELEASE COATINGS

(71) Applicant: NDSU RESEARCH FOUNDATION, Fargo, ND (US)

(72) Inventors: Dean C. Webster, Fargo, ND (US); Jackson Benda, Fargo, ND (US)

(73) Assignee: NDSU RESEARCH FOUNDATION, Fargo, ND (US)

( * ) Notice: Subject to any disclaimer, the term of this patent is extended or adjusted under 35 U.S.C. 154(b) by 758 days.

(21) Appl. No.: 17/229,091

(22) Filed: Apr. 13, 2021

(65) Prior Publication Data

US 2022/0119651 A1 Apr. 21, 2022

Related U.S. Application Data

(60) Provisional application No. 63/008,977, filed on Apr. 13, 2020.

(51) Int. Cl.

| | |
|---|---|
| ***C09D 5/16*** | (2006.01) |
| ***C08G 18/12*** | (2006.01) |
| ***C08G 18/28*** | (2006.01) |
| ***C08G 18/48*** | (2006.01) |
| ***C08G 18/61*** | (2006.01) |
| ***C08G 18/62*** | (2006.01) |
| ***C08G 18/75*** | (2006.01) |
| ***C08G 18/79*** | (2006.01) |
| ***C08G 18/80*** | (2006.01) |
| ***C08G 77/12*** | (2006.01) |
| ***C08G 77/16*** | (2006.01) |
| ***C08G 77/388*** | (2006.01) |
| ***C08G 77/46*** | (2006.01) |

(52) U.S. Cl.

CPC ........... *C09D 5/1637* (2013.01); *C08G 18/12* (2013.01); *C08G 18/283* (2013.01); *C08G 18/289* (2013.01); *C08G 18/4833* (2013.01); *C08G 18/61* (2013.01); *C08G 18/6225* (2013.01); *C08G 18/755* (2013.01); *C08G 18/792* (2013.01); *C08G 18/8064* (2013.01); *C08G 18/809* (2013.01); *C08G 77/12* (2013.01); *C08G 77/16* (2013.01); *C08G 77/388* (2013.01); *C08G 77/46* (2013.01); *C08G 2150/00* (2013.01)

(58) Field of Classification Search

CPC ...... C09D 5/1637; C08G 77/12; C08G 77/46; C08G 77/16; C08G 77/388; C08G 18/6225; C08G 18/61; C08G 18/4833; C08G 18/755; C08G 18/12; C08G 18/283; C08G 18/289; C08G 18/792; C08G 18/8064; C08G 18/809; C08G 2150/00

See application file for complete search history.

(56) References Cited

U.S. PATENT DOCUMENTS

| | | | | |
|---|---|---|---|---|
| 5,763,538 A * | 6/1998 | Hunter | C08K 5/29 | 525/440.06 |
| 7,799,434 B2 | 9/2010 | Webster et al. | | |
| 7,989,074 B2 | 8/2011 | Webster et al. | | |
| 2002/0042002 A1* | 4/2002 | Noh | H01M 10/052 | 429/317 |
| 2014/0371381 A1* | 12/2014 | Holvoet | C08G 18/10 | 524/542 |

FOREIGN PATENT DOCUMENTS

| | | | |
|---|---|---|---|
| EP | 2726559 * | 4/2017 | |
| WO | WO 96/33841 * | 10/1996 | |
| WO | WO-2010009451 A2 * | 1/2010 | A61K 31/485 |
| WO | WO 2016/196565 * | 12/2016 | |

OTHER PUBLICATIONS

Author Unknown, the Gelest Product Bulletin "Reactive Silicones: Forging New Polymer Links", publication date unknown, from https://www.pcimag.com/ext/resources/PCI/Home/Files/PDFs/Virtual_Supplier_Brochures/Gelest_Reactive_Silicones.pdf, pp. 1-62.*

Odian, George, Principles of Polymerization, Third edition, John Wiley & Sons, Inc, 1991, pp. 19-24.*

Yerba et al., "Antifouling Technology—Past, Present and Future Steps Towards Efficient and Environmentally Friendly Antifouling Coatings," Prog. Org. Coat. 2004, 50, 75-104.

Lejars et al., "Fouling Release Coatings: A Nontoxic Alternative to Biocidal Antifouling Coatings," Chem. Rev. 2012, 112, 8, 4347-4390.

Callow et al., "Trends in the Development of Environmentally Friendly Fouling-Resistant Marine Coatings," Nat. Commun. 2011, 2, 244.

Schultz et al., "Economic Impact of Biofouling on a Naval Surface Ship," Biofouling 2011, 27, 1, 87-98.

Callow et al., "Marine Biofouling: A Sticky Problem," Biologist 2002, 49, 1, 10.

Genzer et al., "Recent Developments in Superhydrophobic Surfaces and Their Relevance to Marine Fouling: A Review," Biofouling 2006, 22, 5, 339-360.

Konstantinou et al., "Worldwide Occurrence and Effects of Antifouling Paint Booster Biocides in the Aquatic Environment: A Review" Environ. Int. 2004, 30, 235-248.

Majumdar et al., "Thermoset Siloxane—Urethane Fouling Release Coatings," Smart Coatings 2007, Chapter 5, 61-75.

Bodkhe et al., "The Effect of Formulation Variables on Fouling-Release Performance of Stratified Siloxane-Polyurethane Coatings," J. Coat. Technol. Res. 2012, 9, 3, 235-249.

Iguerb et al., "Antifouling Properties of Poly(methyl methacrylate) Films Grafted with Poly(ethylene glycol) Monoacrylate Immersed in Seawater," Langmuir 2008, 24, 12272-12281.

(Continued)

*Primary Examiner* — Patrick D Niland

(74) *Attorney, Agent, or Firm* — RAPHAEL BELLUM PLLC

(57) ABSTRACT

The invention relates to a curable coating composition comprising at least one surface modifying amphiphilic additive and at least one amphiphilic siloxane-polyurethane coating composition. The invention also relates to methods of making and using the curable coating composition of the invention. The invention also relates to methods for reducing or preventing biofouling of a surface exposed to an aqueous environment comprising the use of the curable coating composition of the invention.

17 Claims, 22 Drawing Sheets

(56) References Cited

OTHER PUBLICATIONS

Feng et al., "Synthesis and characterization of a novel amphiphilic copolymer capable as anti-biofouling coating material," Journal of Applied Polymer Science 2009, 114, 2071-2078.
Bodkhe et al., "Polyurethanes with amphiphilic surfaces made using telechelic functional PDMS having orthogonal acid functional groups," Progress in Organic Coatings 2012, 75, 38-48.
Krishnan et al., "Comparison of the Fouling Release Properties of Hydrophobic Fluorinated and Hydrophilic Pegylated Block Copolymer Surfaces: Attachment Strength of the Diatom Navicula and the Green Alga Ulva," Biomacromolecules 2006, 7, 1449-1462.
Martinelli et al., "Surface engineering of styrene/PEGylated-fluoroalkyl styrene block copolymer thin films," J. Polym. Sci. A Polym. Chem. 2009, 47, 267-284.
Weinman et al., "ABC triblock surface active block copolymer with grafted ethoxylated fluoroalkyl amphiphilic side chains for marine antifouling/fouling-release applications," Langmuir 2009, 25, 20, 12266-12274.
Martinelli et al., "Amphiphilic block copolymer/poly (dimethylsiloxane)(PDMS) blends and nanocomposites for improved fouling-release," Biofouling 2011, 27, 5, 529-541.
Zhu et al., "Multilayers of fluorinated amphiphilic polyions for marine fouling prevention," Langmuir 2013, 30, 288-296.
Gudipati et al., "Hyperbranched fluoropolymer and linear poly (ethylene glycol) based amphiphilic crosslinked networks as efficient antifouling coatings: an insight into the surface compositions, topographies, and morphologies," J. Polym. Sci. A Polym. Chem. 2004, 42, 6193-6208.
Gudipati et al., "The antifouling and fouling-release perfomance of hyperbranched fluoropolymer (HBFP)—poly (ethylene glycol)(PEG) composite coatings evaluated by adsorption of biomacromolecules and the green fouling alga Ulva," Langmuir 2005, 21, 3044-3053.
Martinelli et al., "Amphiphilic modified-styrene copolymer films: Antifouling/fouling release properties against the green alga Ulva linza," Progress in Organic Coatings 2016, 90, 235-242.
Rufin et al., "Antifouling silicones based on surface-modifying additive amphiphiles," Green Materials 2017, 5, 4-13.
Galhenage et al., "Poly (ethylene) glycol-modified, amphiphilic, siloxane—polyurethane coatings and their performance as fouling-release surfaces," J Coat Technol Res 2017, 14, 307-322.
Callow et al., "Efficacy testing of nonbiocidal and fouling-release coatings," Biofouling methods 2014, Chapter 10, 291-316.
Stafslien et al., "Combinatorial materials research applied to the development of new surface coatings VI: An automated spinning water jet apparatus for the high-throughput characterization of fouling-release marine coatings," Rev. Sci. Instrum. 2007, 78, 072204.
Casse et al., "Combinatorial Materials Research Applied to the Development of New Surface Coatings V. Application of a Spinning Water-Jet for the Semi-High Throughput Assessment of the Attachment Strength of Marine Fouling Algae," Biofouling 2007, 23 (2), 121-130.
Casse et al., "Laboratory Screening of Coating Libraries for Algal Adhesion," Biofouling 2007, 23 (3/4), 267-276.
Stafslien et al., "An Improved Laboratory Reattachment Method for the Rapid Assessment of Adult Barnacle Adhesion Strength to Fouling-Release Marine Coatings," J Coat Technol Res 2012, 9, 651-665.
Rittschof et al., "Barnacle Reattachment: A Tool for Studying Barnacle Adhesion," Bioflouling 2008, 24 (1), 1-9.

* cited by examiner

AMPHIPHILIC SILOXANE-POLYURETHANE FOULING-RELEASE COATINGS

CROSS-REFERENCE TO RELATED APPLICATIONS

This application claims priority to U.S. Provisional Application No. 63/008,977, filed Apr. 13, 2020, which is incorporated herein by reference.

STATEMENT OF U.S. GOVERNMENT SUPPORT

This invention was made with government support under grant N00014-16-1-3064 awarded by the Office of Naval Research (ONR). The U.S. government has certain rights in the invention.

BACKGROUND OF THE INVENTION

The settlement, growth, and accumulation of biological organisms on materials submerged in seawater is typically denoted as marine biofouling.[1] This process is complex, involving a large number of different micro- and macrofoulants with some estimates approaching 4000 species.[1-3] As soon as a material, whether it's a marine vessel, concrete post, or buoy, is submerged in seawater, marine biofouling begins to take place within seconds. Free-floating nutrients, proteins, and other smaller molecules in seawater first form a conditioning film at the surface of the material.[3] Next, the majority of new settling foulants consist of marine bacterium and unicellular organisms that start with a "pre-settlement" behavior largely consisting of electrostatic interactions, which then proceed to more permanent, covalent interactions.[4] Larger foulants such as algae spores and diatoms then begin to settle and agglomerate on the surface, followed by some of the largest macrofoulants; marine mussels, barnacles, and tunicates. This process usually occurs within seconds/minutes and continues for days, weeks, and sometimes months until the surface is completely covered.[3] Due to the highly dynamic nature of marine biofouling, and the diversity of fouling species, preventing marine biofouling is no simple task and is a great hindrance to global maritime activity.

As these micro- and macrofoulants begin to settle and agglomerate on ships hulls, a wide variety of problems arise. One problem, and often noticed before others, is the negative aesthetic effect on the marine vessel. This typically does not impact marine vessels involved in international shipping, but could potentially affect a cruise liner, where clean looks often bring more passengers and a more positive reputation. Another problem is the drastic reduction in marine vessel performance. As organisms begin to accumulate, large reductions in vessel maneuverability and speed occur.[5, 6] Consequences of this include an increase in fuel consumption leading to increased production of harmful greenhouse gases. In addition to a decrease in performance, biomass accumulating on a vessels hull can accelerate corrosion and increase the frequency, and the time spent, in dry dock. Both these issues combined result in nearly 1 billion US dollars per year for the US Navy.[6] Lastly, due to the global nature of international shipping and transportation, the probability of introducing invasive marine organisms into non-native environments increases as foulants accumulate on marine vessels.[7] Even small amounts of marine biofouling can be detrimental, and as such, research into prevention of this phenomenon is of great importance.

Some of the earliest methods of preventing marine biofouling was to cover the wooden hulls of seafaring vessels with copper or lead sheathing.[2] This modification makes the surface of the ships unfavorable for settlement due to the anti-microbial properties of copper and heavy metal toxicity of lead. However, as the wooden hulls of ships were replaced with iron or steel hulls, problems with corrosion and toxicity concerns prompted the need for more advanced anti-fouling technologies. Between the 1960's and 1970's, polymeric coatings systems were introduced to help combat marine biofouling. During this time, self-polishing copolymer coatings with controlled release of biocides such as tributyl tin (TBT) quickly gained popularity.[1, 2] Soon after its introduction, concerns about TBT's toxicity to non-target organisms and the environment were raised. As a result, tight restrictions were placed on the usage of TBT-containing paints, with a total ban being issued by the International Maritime Organization (IMO) in 2003.[1] To replace the well-performing TBT-containing paints, the same self-polishing copolymer systems were combined with more environmentally friendly copper oxide (CuO) as an anti-fouling approach.[8] Although this approach is less toxic, it is less sustainable and more environmentally costly. Therefore, an increase of research into non-toxic anti-fouling (AF)/fouling-release (FR) coatings systems began.[3]

The primary commercial FR coating systems typically consist of silicone elastomers. These elastomers allow a weak attachment of fouling organisms, which can then be removed with cleaning, or under hydrodynamic flow.[3] However, some major drawbacks of these types of systems is their poor mechanical and adhesion properties, which eventually lead to a reduction in FR performance over time.[1, 3] To improve upon these FR systems, research performed at North Dakota State University introduced polydimethylsiloxane (PDMS) into a polyurethane coating system. This siloxane-polyurethane (SiPU) system resulted in improved FR performance due to the self-stratifying layer of PDMS at the surface, with the bulk of the coating consisting of mechanically durable polyurethane.[9-11] Another advantage of this coating system is that due to their superior adhesion to primer/substrates, tie-coat application is no longer needed.[12] Even with these recent advancements in non-toxic FR technology, their price to performance ratio is comparable at best to biocide containing AF paints. This may be due to the one-dimensional design of these systems, solely relying on a hydrophobic, low surface energy surface to combat biofouling. Hence, the next step in FR technology research became focused on developing coatings systems with heterogenous surfaces, consisting of both hydrophobic and hydrophilic domains. The introduction of such a surface is thought to reduce the effectiveness of some of the more common glycoprotein based adhesion mechanisms employed by fouling organisms.[13]

A common way of designing a coatings matrix to include hydrophobic and hydrophilic groups involves reactive cross-linking chemistries. An example of this approach involved the usage of perfluoropolyether hydrophobic segments copolymerized through free-radical polymerization with hydrophilic oligo(ethylene glycol) groups to produce a coating with enhanced AF performance against microfoulants.[14] Polyethylene glycol as hydrophilic groups in these amphiphilic coatings is used due to its high protein resistance.[13] This prevention of biofouling is one area of performance that previous, solely hydrophobic FR coatings performed poorly in, and is an important aspect in preventing large accumulations of marine biofoulants. In another approach, a hybrid siloxane-polyurethane (SiPU) was designed to incorporate orthogonal acid functional groups. Vinyl functional amino-propyl terminated PDMS was synthesized via ring-opening polymerization and thiol-ene "click" chemistry was used to introduce acid functional groups. Once reacted with a polyol and polyisocyanate, the acid functional PDMS (PDMS-A) self-stratifies to the surface and presents both hydrophobic PDMS and hydrophilic acid groups that potentially interrupt electrostatic interactions between the substrate and glycoproteins from various foulants.[15] Other popular amphiphilic systems include self-assembled monolayers (SAMs), styrene-ethylene-butylene-styrene (SEBS) based thermoplastic elastomers, layer-by-layer polymer films (LbL), PDMS modified elastomers, hyperbranched polymer networks (HBPN), and amphiphilic zwitterionic polymers.[16-22, 23]

In addition to designing coating systems to include hydrophobic and hydrophilic groups as segments within a coating matrix, another method to introduce amphiphilic, heterogenous character to a coatings surface is through surface modifying amphiphilic additives. Research performed in the Grunlan research group at Texas A&M University's Department of Biomedical Engineering involved the synthesis of surface modifying additives (SMA) consisting of poly(ethylene oxide) (PEO) and oligomeric poly(dimethylsiloxane) (ODMS).[24] These SMAs varied by PEO length, ODMS tether length, and whether they were di- or tri-block copolymers. Additives were blended in a room temperature vulcanizing (RTV) silicone elastomer at small weight percentages. The resultant films were shown to have a rapidly decreasing water contact angle over 5 minutes, pointing to the SMAs segregating to the surface, exposing hydrophilic PEO groups that would lower water contact angle measurements. Human Fibrinogen (HF) absorption assays were also performed and showed that as SMAs were included, protein resistance was greatly increased.[24] This approach to providing amphiphilic character through amphiphilic additives has also been adopted by newer commercial products provided by Hempasil and International Paint.

This invention describes the effect on AF/FR performance when a surface modifying amphiphilic additive (SMAA) is incorporated into a next generation amphiphilic siloxane-polyurethane developed previously.

SUMMARY OF THE INVENTION

The invention relates to the use of surface modifying amphiphilic additives (SMAAs) in an amphiphilic siloxane-polyurethane coating (SiPU) composition. Thus, the invention relates to a curable coating composition comprising, consisting essentially of, or consisting of: a) at least one SMAA; b) at least one polyisocyanate; c) at least one polyol; and d) at least one amphiphilic poly(ethylene glycol) methyl ether-poly(dimethylsiloxane) (mPEG-PDMS) isocyanate pre-polymer.

The SMAA used in the invention comprises, consists essentially of, or consists of the reaction product of a1) at least one Si—H functional siloxane; and a2) at least one allyl-functional poly(ethylene glycol) methyl ether (allyl-functional mPEG). The amphiphilic mPEG-PDMS isocyanate pre-polymer comprises, consists essentially of, or consists of the reaction product of d1) at least one polyisocyanate; d2) at least one monocarbinol-terminated poly(dimethylsiloxane) (PDMS); and d3) at least one poly (ethylene glycol) methyl ether (mPEG), wherein the amphiphilic mPEG-PDMS isocyanate prepolymer, d), has an overall isocyanate to total hydroxyl equivalent ratio such that isocyanate is in excess.

The invention also relates to methods of making and using the curable coating composition of the invention.

The invention further relates to objects or substrates coated with the curable coating composition of the invention, which may then be cured for a coating.

The invention also relates to a cured coating composition of the invention.

The invention also relates to a marine fouling-release coating comprising, consisting essentially of, or consisting of the curable coating composition of the invention.

The invention also relates to a method for reducing or preventing biofouling of a surface exposed to an aqueous environment comprising, consisting essentially of, or consisting of the steps of: (1) coating at least a portion of the surface with the curable coating composition of the invention to form a coated surface, and (2) curing the coating composition on the coated surface.

DESCRIPTION OF THE INVENTION

Figure 1:
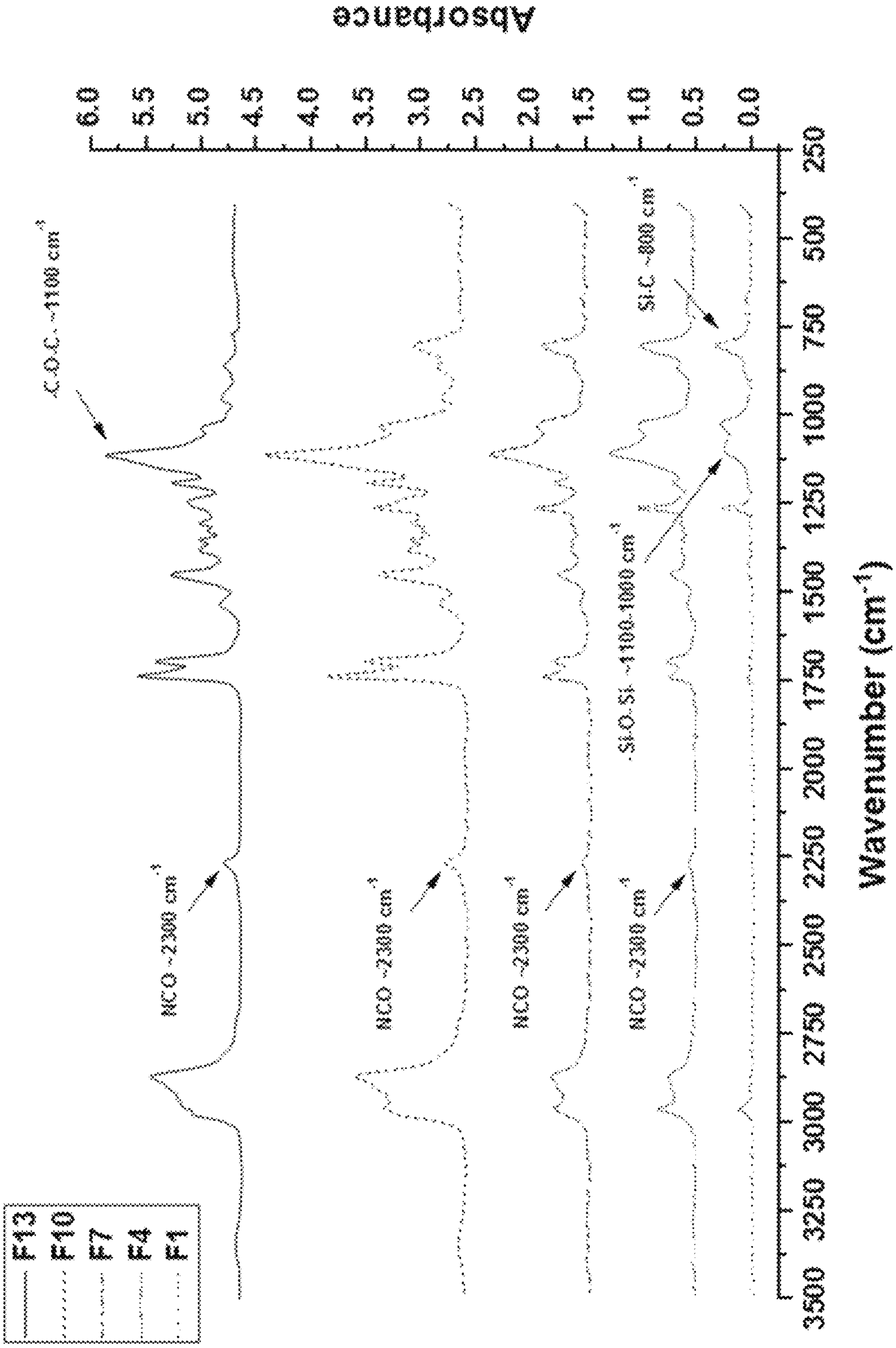
FIG. 1 shows the FTIR spectra for compositions F1, F4, F7, F10, and F13 with no added SMAA wt. %, showing presence of isocyanate groups as well as the changes in peaks representing PDMS and mPEG chains on the pre-polymers.

The invention relates to a curable coating composition comprising, consisting essentially of, or consisting of:

- a) at least one surface modifying amphiphilic additive (SMAA), comprising, consisting essentially of, or consisting of the reaction product of:
  - a1) at least one Si—H functional siloxane; and
  - a2) at least one allyl-functional poly(ethylene glycol) methyl ether (allyl-functional mPEG);
- b) at least one polyisocyanate;
- c) at least one polyol; and
- d) at least one amphiphilic poly(ethylene glycol)-poly (dimethylsiloxane) (mPEG-PDMS) isocyanate prepolymer, comprising, consisting essentially of, or consisting of the reaction product of:
  - d1) at least one polyisocyanate;
  - d2) at least one monocarbinol-terminated poly(dimethylsiloxane) (PDMS); and
  - d3) at least one poly(ethylene glycol) methyl ether (mPEG), wherein the at least one amphiphilic mPEG-PDMS isocyanate prepolymer, d), has an overall isocyanate to total hydroxyl equivalent ratio such that isocyanate is in excess.

The Si—H functional siloxane, a1), may have the following structures, for example:

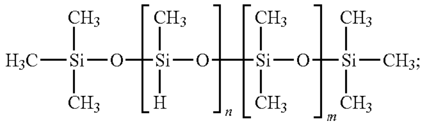

or

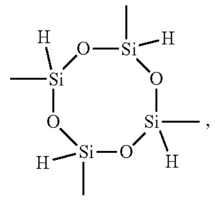

, wherein:

m ranges from 0 to 270; and n ranges from 2 to 270.

For example, when m is 0, the Si—H functional siloxane, a1), may have the following structure:

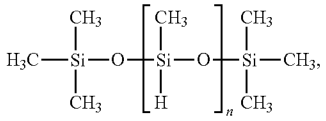

wherein n ranges from 2 to 270.

The Si—H functional siloxane may have a molecular weight ranging from about 250-50,000 g/mol (e.g., 500-40,000 g/mol, 1,000-30,000 g/mol, 2,000-20,000 g/mol, 5,000-10,000 g/mol, 500-15,000 g/mol, 900-1,200 g/mol).

The Si—H functional siloxane may be selected from the group consisting of a 100 mol % Si—H polymethylhydrosiloxane, a copolymer of methylhydrosiloxane-dimethylsiloxane of varying mol % Si—H, a tetra functional Si—H cyclosiloxane, and mixtures thereof. Preferably, the 100 mol % Si—H polymethylhydrosiloxane is at least one Si—H trimethylsiloxyl terminated polymethylhydrosiloxane, and has a molecular weight ranging from 1,400-1,800 g/mol, 1,800-2,100 g/mol, 2,100-2,400 g/mol, 2,400-3,000 g/mol, 3,000-4,000 g/mol, 4,000-12,000 g/mol, 12,000-20,000 g/mol, 20,000-50,000 g/mol. The copolymer of methylhydrosiloxane-dimethylsiloxane of varying mol % Si—H may have a molecular weight of about 250-10,000 g/mol, 500-5,000 g/mol, 750-2,500 g/mol, more preferably about 900-1,200 g/mol, and may contain about 10-90% (e.g., 20-85%, 30-75%, 40-65%, 45-55%) Si—H functional groups, preferably 45-55%. Preferably, the copolymer of methylhydrosiloxane-dimethylsiloxane of varying mol % Si—H is at least one methylhydrosiloxane-dimethylsiloxane copolymer, and has 25-35 mol % Si—H and a molecular weight ranging from 1900-2000 g/mol, or 45-55 mol % Si—H and a molecular weight ranging from 900-1200 g/mol. Preferably, the tetra functional Si—H cyclosiloxane is Si—H functional 1,3,5,7-tetramethylcyclotetrasiloxane (D'4).

The allyl functional mPEG, a2), (also referred to as an allyl-terminated mPEG or a monoallyl-terminated mPEG) may have a molecular weight ranging from about 100-20,000 g/mol (e.g., 250-15,000 g/mol, 500-10,000 g/mol, 750-1,000 g/mol), such as 250 g/mol, 350 g/mol, 750 g/mol, or 1,100 g/mol. It may comprise, consist essentially of, or consist of the reaction product of a hydroxyl-terminated poly(ethylene glycol) monomethyl ether and allyl bromide.

The Si—H functional siloxane and the allyl functional mPEG may be reacted in a ratio of allyl to Si—H groups on the Si—H functional siloxane of 1:1 to 0.2:1. Preferably, the allyl functional mPEG is reacted with the Si—H functional siloxane in about a 1.0:1.0 molar equivalent ratio to make the SMAAs used in the invention.

In the SMAA, the chains of the mPEG are attached to the backbone of the Si—H functional siloxane (e.g., about 1%-100%, about 5%-99%, about 10%-95%, about 15%-90%, about 20%-80%, about 30%-70%, about 40%-60%, about 45-55% of the backbone of the Si—H functional siloxane contain the chains of the mPEG).

The SMAA may have the following structure:

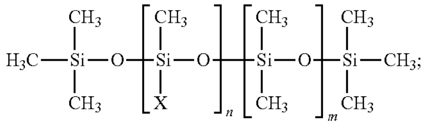

or

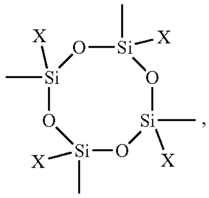

wherein:

X is

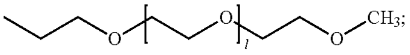

l and m, independent of one another, range from 0 to 270; and n ranges from 2 to 270.

For example, when m is 0, the SMAA may have the following structure:

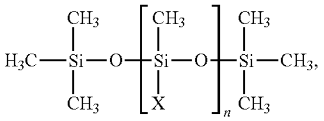

wherein:

X is

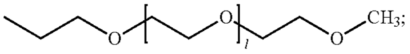

l ranges from 0 to 270; and n ranges from 2 to 270.

The SMAA may be present in the curable coating composition in an amount ranging from about 0.1 to 40 wt. % (e.g., 0.1 to 10 wt. %, 0.5 to 5 wt. %, 1 to 3 wt. %), based on the solid content of the curable coating composition.

Exemplary SMAAs that may also be used in the invention are disclosed in US 2019/0309187 (e.g., 991-g-250, 992-g-

250, 993-g-250, 301-g-250, 501-g-250, D'4-g-250, 991-g-350, 992-g-350, 993-g-350, 301-g-350, 501-g-350, D'4-g-350, 991-g-750, 992-g-750, 993-g-750, 301-g-750, 501-g-750, D'4-g-750, 991-g-1100, 992-g-1100, 993-g-1100, 301-g-1100, 501-g-1100, D'4-g-1100), which is incorporated herein by reference.

As discussed above, besides the SMAA, the curable coating composition comprises, consists essentially of, or consists of:

b) at least one polyisocyanate;

c) at least one polyol; and d) at least one amphiphilic mPEG-PDMS isocyanate pre-polymer, comprising, consisting essentially of, or consisting of the reaction product of:

d1) at least one polyisocyanate;

d2) at least one monocarbinol-terminated PDMS; and d3) at least one mPEG, wherein the at least one amphiphilic mPEG-PDMS isocyanate prepolymer, d), has an overall isocyanate to total hydroxyl equivalent ratio such that isocyanate is in excess.

Components b), c), and d) make up the amphiphilic SiPU coating composition part of the curable coating composition.

The polyisocyanate, b) and d1), are, independent of one another, selected from the group consisting of an aliphatic polyisocyanate, a cycloaliphatic polyisocyanate, an araliphatic polyisocyanate, an aromatic polyisocyanate, and mixtures thereof. For example, the polyisocyanate, b) and d1), may be, independent of one another, selected from the group consisting of:

(I)

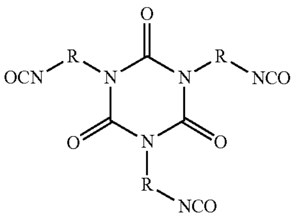

(II)

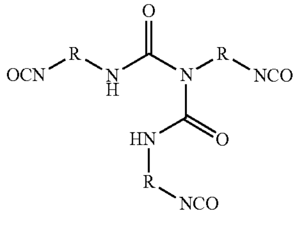

wherein R is independently an optionally substituted, divalent $C_1$-$C_{15}$ alkyl, an optionally substituted $C_3$-$C_{15}$ cycloalkyl, or a group selected from:

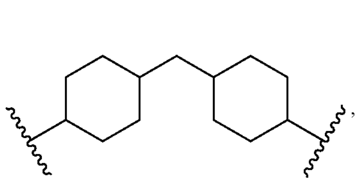

,

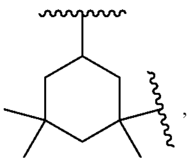

,

-continued

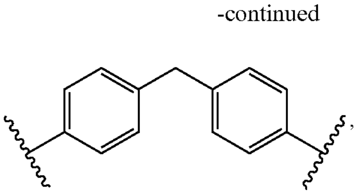, 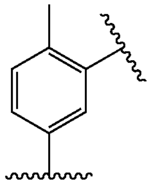,

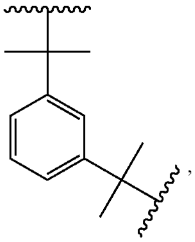, and 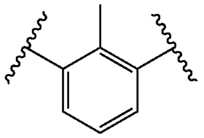.

Preferably, R is a $C_2$-$C_{10}$ straight chain or branched alkyl.

Any suitable organic polyisocyanate, such as an aliphatic, cycloaliphatic, araliphatic or aromatic polyisocyanate, may be used either singly or in mixtures of two or more. The aliphatic isocyanates provide generally better light stability than the aromatic compounds. Aromatic polyisocyanates, on the other hand, are generally more economical and reactive toward polyols and other poly(active hydrogen) compounds than aliphatic polyisocyanates. Suitable aromatic polyisocyanates include but are not limited to those selected from the group consisting of 2,4-toluene diisocyanate, 2,6-toluene diisocyanate, a dimer of toluene diisocyanate (available under the Desmodur® from Covestro LLC, Leverkusen, Germany), diphenylmethane 4,4'-diisocyanate (MDI), 1,5-diisocyanato-naphthalene, 1,4-phenylene diisocyanate, 1,3-phenylene diisocyanate, fluorinated and/or silicone containing derivatives of the aforementioned, and mixtures thereof. Examples of useful cycloaliphatic polyisocyanates include but are not limited to those selected from the group consisting of dicyclohexylmethane diisocyanate ($H_{12}$ MDI, commercially available under the Desmodur® from Covestro LLC, Leverkusen, Germany), isophorone diisocyanate (IPDI), 1,4-cyclohexane diisocyanate (CHDI), 1,4-cyclohexanebis(methylene isocyanate) (BDI), 1,3-bis(isocyanatomethyl)cyclohexane ($H_6$ XDI), and mixtures thereof. Examples of useful aliphatic polyisocyanates include but are not limited to those selected from the group consisting of hexamethylene 1,6-diisocyanate (HDI), 1,12-dodecane diisocyanate, 2,2,4-trimethyl-hexamethylene diisocyanate (TMDI), 2,4,4-trimethyl-hexamethylene diisocyanate (TMDI), 2-methyl-1,5-pentamethylene diisocyanate, dimer diisocyanate, the urea of hexamethyl diisocyanate, and mixtures thereof. Examples of useful araliphatic polyisocyanates include but are not limited to those selected from the group consisting of m-tetramethyl xylylene diisocyanate (m-TMXDI), p-tetramethyl xylylene diisocyanate (p-TMXDI), 1,4-xylylene diisocyanate (XDI), 1,3-xylylene diisocyanate, or mixtures thereof.

Preferably, the polyisocyanate, b) and d1), are, independent of one another, selected from the group consisting of methylene diphenyl diisocyanate and trimers thereof, hexamethylene diisocyanate and trimers thereof, isophorone diisocyanate and trimers thereof, and mixtures thereof. More preferably, the polyisocyanate, b) and d1), are isophorone diisocyanate and trimers thereof.

The polyol, c), may be selected from the group consisting of a polyester polyol, a polyether polyol, a polycarbonate polyol, an acrylic polyol, and mixtures thereof. Preferably, the polyol is an acrylic polyol (e.g., an acrylic polyol composed of 80% butyl acrylate and 20% 2-hydroxyethyl acrylate). The polyol may include polyol having at least three hydroxyl groups. A mixture of polyols can also be used in formulating the SiPU coating composition.

Polyester polyols can include those made from the melt polycondensation of polyfunctional acids with polyfunctional alcohols or those made from the ring opening polymerization of cyclic monomers such as epsilon-caprolactone. Examples of suitable polyester polyols include, for example, poly(caprolactone) polyols, poly(hexamethylene adipate), and the like. Examples of suitable polyether polyols include, for example, poly(ethyleneglycol), poly(propylene glycol), poly(butylene glycol), poly(tetramethylene oxide), and the like.

Acrylic polyols may be synthesized, typically by free radical polymerization, from a mixture of at least one hydroxy functional monomer plus one or more non-functional monomers. Suitable hydroxy-functional monomers include, for example, hydroxyethyl acrylate, hydroxyethyl methacrylate, hydroxypropyl acrylate, hydroxypropyl methacrylate, and the like. Examples of non-functional monomers include, for example, styrene, methyl methacrylate, methyl acrylate, butyl methacrylate, butyl acrylate, lauryl methacrylate, lauryl acrylate, 2-ethylhexyl acrylate, 2-ethyl hexyl methacrylate, and the like. The acrylic polyol may be synthesized in solution using a thermally-activated free radical initiator. The polyol can be synthesized in either a batch, semi-batch or continuous process. Examples of free radical initiators are benzoyl peroxide, t-amyl peroxy-2-ethylhexanoate, t-butyl hydroperoxide, di-t-butyl peroxide, azobisisobutyronitrile, azobisisovaleronitrile, and the like. The acrylic polyol may be made by free radical polymerization and then diluted in a solvent, such as toluene, xylene, methylisobutyl ketone, and the like. In one embodiment, the polyol may include a polycaprolactone polyol such as a polycaprolactone triol.

The monocarbinol-terminated PDMS, d2), may have a molecular weight ranging from about 400-50,000 g/mol (e.g., 500-40,000 g/mol, 750-30,000 g/mol, 1,000-20,000 g/mol, 2,000-15,000 g/mol, 3,000-12,500 g/mol, 5,000-10,000 g/mol), preferably, about 10,000 g/mol. The monocarbinol-terminated PDMS, d2), may have the following structure:

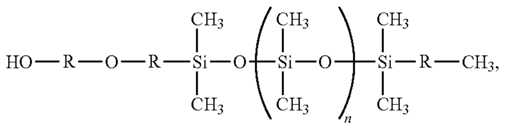 or

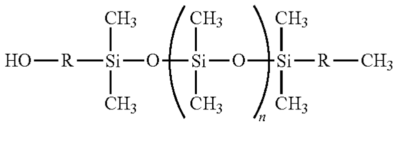

wherein R, independent of one another, is a $C_3$-$C_{12}$ straight chain alkyl or an alkylene ether;

wherein n ranges from 0 to about 270.

The mPEG, d3), may have a molecular weight ranging from about 350-20,000 g/mol (e.g., 400-15,000 g/mol, 500-12,500 g/mol, 750-10,000 g/mol, 1,000 g/mol-7,500 g/mol, 2,000-5,000 g/mol, 3,000-4,000 g/mol), such as 550-750 g/mol, preferably, about 750 g/mol.

The amphiphilic mPEG-PDMS isocyanate prepolymer, d), may contain about 0.1-20 wt. % (e.g., 0.1, 0.2, 0.5, 1, 5, 10, 15, 20 wt. %) of the monocarbinol-terminated PDMS, d2), and about 0.1-20 wt. % (e.g., 0.1, 0.2, 0.5, 1, 5, 10, 15, 20 wt. %) of the mPEG, d3), based on the solid content of the amphiphilic mPEG-PDMS isocyanate prepolymer, d). For example, the amphiphilic mPEG-PDMS isocyanate prepolymer, d), may contain monocarbinol-terminated PDMS, d2):mPEG, d3) in a ratio ranging from 0.1:20 wt. % to 20:0.1 wt. % (e.g., 1:19 wt. %, 5:15 wt. %, 10:10 wt. %, 15:5 wt. %, 19:1 wt. %), based on the solid content of the amphiphilic mPEG-PDMS isocyanate prepolymer, d). Preferably, the amphiphilic mPEG-PDMS isocyanate prepolymer, d), contains about 20 wt. % total of the monocarbinol-terminated PDMS, d2), and the mPEG, d3), based on the solid content of the amphiphilic mPEG-PDMS isocyanate prepolymer, d).

As discussed above, the at least one amphiphilic mPEG-PDMS isocyanate prepolymer, d), has an overall isocyanate to total hydroxyl equivalent ratio such that isocyanate is in excess. For example, the isocyanate to total hydroxyl equivalent ratio in the amphiphilic mPEG-PDMS isocyanate prepolymer, d), may range from 1.5:1 to 1.1:1.

Exemplary amphiphilic SiPU coating compositions that may also be used in the invention are disclosed in US 2018/0163087, which is incorporated herein by reference.

The SMAAs used in the invention may be incorporated into the amphiphilic SiPU coating composition in an amount ranging from 0.1-10 wt. % (e.g., 0.1, 0.2, 0.5, 1, 5, 10 wt. %), based on the total solid content of the curable coating composition.

The reaction to make the SMAA and/or the of the Si—H functional siloxane, a1), and the amphiphilic mPEG-PDMS isocyanate prepolymer, d), may further comprise an optional catalyst and/or solvent. Catalysts can be either organometallic complexes or organic bases, and other such catalysts known in the art. Examples of organometallic compounds are dibutyl tin dilaurate, dibutyl tin diacetate, bismuth carboxylate, and compounds of zirconium and aluminum such as K-Kat 4205, K-Kat-5218, and K-Kat-XC-6212. Examples of organic base catalysts are sold under the DABCO trade name by Air Products. DABCO is 1,4-diazabicyclo[2.2.2]octane. Suitable examples of isocyanate reaction catalysts include diethyl tin diacetate, dibutyltin diacetate, dibutyltin dilaurate, dibutyltin maleate, dilauryltin diacetate, dioctyltin diacetate, or a mixture thereof. The isocyanate reaction catalyst may include a tin catalyst. For example, the SMAA may be made using at least one optional catalyst (e.g., Karstedt's catalyst).

While the curable coating compositions of the invention may be a solvent-free coating composition, it may also optionally contain a solvent such as, for example, acetone, THF, methyl ethyl ketone (MEK), xylene, acetone, acetylacetone, benzene, toluene, methyl amyl ketone (MAK), methyl isobutyl ketone, butyl acetate, t-butyl acetate, ethyl 3-ethoxypropionate (EEP), isopropanol, aromatic 100, aromatic 150, tetrahydrofuran, diethyl ether, butanol, butoxyethanol, etc. The curable coating compositions may be a solution in such a solvent or mixture of solvents.

The curable coating compositions of the invention may further contain a pigment (organic or inorganic), if a coating having a particular color is desired, and/or additives and fillers known in the art. For example, the curable coating compositions of the invention may further contain coating additives. Examples of such coating additives include, but are not limited to, one or more leveling, rheology, and flow control agents such as silicones, fluorocarbons, or cellulosics; extenders; reactive coalescing aids such as those described in U.S. Pat. No. 5,349,026, incorporated herein by reference; plasticizers; flatting agents; pigment wetting and dispersing agents and surfactants; ultraviolet (UV) absorbers; UV light stabilizers; tinting pigments; colorants; defoaming and antifoaming agents; anti-settling, anti-sag and bodying agents; anti-skinning agents; anti-flooding and anti-floating agents; biocides, fungicides, and mildewcides; corrosion inhibitors; thickening agents; or coalescing agents. Specific examples of such additives can be found in Raw Materials Index, published by the National Paint & Coatings Association, 1500 Rhode Island Avenue, N.W., Washington, D.C. 20005. Further examples of such additives may be found in U.S. Pat. No. 5,371,148, incorporated herein by reference.

Examples of flatting agents include, but are not limited to, synthetic silica, available from the Davison Chemical Division of W. R. Grace & Company as SYLOID®; polypropylene, available from Hercules Inc., as HERCOFLAT®; synthetic silicate, available from J. M. Huber Corporation, as ZEOLEX®.

Examples of viscosity, suspension, and flow control agents include, but are not limited to, polyaminoamide phosphate, high molecular weight carboxylic acid salts of polyamine amides, and alkylene amine salts of an unsaturated fatty acid, all available from BYK Chemie U.S.A. as ANTI TERRA®. Further examples include, but are not limited to, polysiloxane copolymers, polyacrylate solution, cellulose esters, hydroxyethyl cellulose, hydroxypropyl cellulose, polyamide wax, polyolefin wax, hydroxypropyl methyl cellulose, polyethylene oxide, and the like.

The invention also relates to methods of using the curable coating composition of the invention. For example, the invention relates to methods of making a cured coating composition using the curable coating composition of the invention.

The invention further relates to objects (e.g., boats, ships, yachts, oil rigs, submarines, etc.) or substrates (e.g., iron, steel, aluminum, fiberglass, primer coated iron, concrete, etc.) coated with the curable coating composition of the invention, which may then be cured to form a coating.

The invention also relates to a cured coating composition of the invention. The curable coating compositions of the invention may be cured at room temperature (ambient cure) or at elevated temperatures (thermal cure). For example, the curable coating compositions can be cured at ambient temperatures for 24 hours and then placed in an oven at 80° C. for 45 minutes.

The invention also relates to a marine fouling-release coating comprising, consisting essentially of, or consisting of the curable coating composition of the invention.

The invention also relates to a method for reducing or preventing biofouling of a surface exposed to an aqueous environment comprising, consisting essentially of, or consisting of the steps of: (1) coating at least a portion of the surface with the curable coating composition of the invention to form a coated surface, and (2) curing the coating composition on the coated surface.

The invention also relates to methods of making the curable coating composition comprising, consisting essentially of, or consisting of combining the at least one SMAA, a), with the at least one amphiphilic SiPU coating composition (i.e., the at least one polyisocyanate, b), the at least one polyol, c), and the at least one amphiphilic mPEG-PDMS isocyanate pre-polymer, d)).

EXAMPLES

In the examples below, the amphiphilic SiPU is an isocyanate pre-polymer containing 10 wt. % of PDMS and mPEG, and unreacted isocyanate groups, which are then added to a composition of additional unmodified isocyanate and an acrylic polyol crosslinker.[25] In addition to describing the incorporation of various SMAAs, the ratio of PDMS to mPEG in the pre-polymers, and its effect on AF/FR performance, is exemplified. The SMAA is a previously synthesized SMAA, which has a backbone of poly(methylhydro-co-dimethylsiloxane) ~900-1200 g/mol molecular weight, with 45-55% grafted mPEG chains of ~350 g/mol molecular weight. Five different PDMS:mPEG ratios are exemplified, with SMAA added at 0 wt. %, 5 wt. %, and 10 wt. %. Coatings were cast on 3"×6" and 4"×8" primed aluminum panels using a Gardco #80 wire drawdown bar and water contact and methylene iodide contact angles were measured over 10 minutes. Atomic force microscopy (AFM) was also used to investigate surface morphology both in the dry and hydrated states. Panels were immersed in circulating tap water for 28 days before performing AF/FR biological assays with marine bacterium *C. lytica*, diatom *N. incerta*, macroalgae *U. linza*, marine mussel *G. demissa*, and marine barnacle *A. amphitrite*. Water and methylene iodide contact angles were measured after 28 days water immersion and compared to values measured before water immersion. Lastly, surface energies for before and after water immersion periods were calculated and compared.

Materials

Solvents such as toluene, methyl amyl ketone (MAK), isopropanol, ethyl-3-ethoxyproprionate (EEP), and acetone were purchased from Sigma Aldrich. Drying of solvents was facilitated by 4 Å molecular sieves, 4-8 mesh, and purchased from Sigma Aldrich. Hydroxy terminated polyethylene glycol monomethyl ether (PEG 750) with molecular weight of 750 g/mol, platinum(0)-1,3-divinyl-1,1,3,3-tetramethyldisiloxane complex solution ~2% Pt in xylenes (Karstedt's catalyst), dibutyltin diacetate (DBTDAc), Darco G-60-100 mesh activated carbon, acetylacetone, and 0.1 N dibutyl amine were also purchased from Sigma Aldrich. A polymethylhydrosiloxane (PMHS) copolymer, HMS-501, containing ~45-55% Si—H functional groups, and monocarbinol-terminated polydimethyl siloxane (PDMS) with a molecular weight of 10K g/mol (MCR-C22) were purchased from Gelest Inc. Monoallyl-terminated polyethylene glycol monomethyl ether with molecular weight of 350 g/mol (APEG 350) was provided by Clariant. Polyisocyanate Desmodur Z 4470 BA was provided by Covestro LLC. Hydrochloric acid of 0.1 N, and potassium bromide optical discs used during Fourier Transform Infrared Spectroscopy (FTIR) were purchased from Alfa Aesar. For use in coating compositions, an acrylic polyol consisting of 80% butyl acrylate and 20% 2-hydroxyethyl acrylate was synthesized via conventional free radical polymerization and diluted to 50% in toluene. A more detailed description of the synthesis can be found elsewhere.[12] Coatings were cast on either 3×6 in. or 4×8 in. aluminum panels (0.6-mm-thick, type A, alloy 3003 H14) purchased from Q-lab. These panels were first sandblasted and primed with Intergard 264 marine primer, provided by AkzoNobel International Paint. Intersleek® 700 (IS700), Intersleek® 900 (IS900), and Intersleek® 1100 SR (IS1100SR) were used as commercial fouling-release coatings and provided by AkzoNobel International Paint. Silastic™ T2 (T2), a silicone elastomer, was used as control coating and provided by Dow Corning. A polyurethane (PU) without any PDMS or mPEG and polystyrene (PS) were also used as controls. Falcon sterile polystyrene 24-multiwell plates were purchased from VWR International.

Synthesis of Surface Modifying Amphiphilic Additive (SMAA)

The SMAA that was selected for incorporation into the amphiphilic siloxane-polyurethane (SiPU) coatings had a PDMS backbone with an average molecular weight between 900-1200 g/mol (HMS-501) with about 45-55% of this backbone grafted with chains of APEG 350. To synthesize the additive, 1.0:1.0 equivalents of APEG 350 to HMS-501 were combined with toluene, dried overnight with 4 Å molecular sieves, and Karstedt's catalyst. A general synthesis follows. Starting with 20 grams of APEG 350, dried in an oven at >100° C. for at least 1 hour, this amount was added to a 3-neck 100 mL round-bottomed flask along with ~80 mL of toluene dried with 4 Å molecular sieves and a Teflon coated stir bar. This mixture was heated to 80° C. and then 75 μL Karstedt's catalyst (0.0535 g) in ~5 mL of dried toluene was added to the flask. Next, an addition funnel was placed on the flask and was charged with HMS-501 (7.7143 g) and ~20 mL of dried toluene. This mixture was added dropwise over the course of 30 minutes to the flask and stirred at 80° C. for at least 16 hours. After this time, ~4 small scoops of activated carbon (60 mesh) were added to the flask, temperature was increased to 90° C. and stirred for an additional 2 hours. The flask was allowed to cool to room temperature, filtered over Celite filter aid, and solvent removed under reduced pressure. FT-IR and $^1$H-NMR were performed to confirm the disappearance of C═C from APEG 350 and Si—H from HMS-501.

Scheme 1: Structure of SMAA with a PDMS backbone between 900-1200 g/mol with ~45-55% of the backbone containing grafted mPEG chains of 350 g/mol

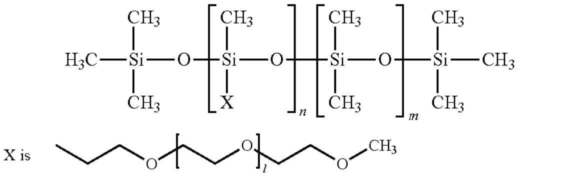

Synthesis of Amphiphilic Isocyanate-Functional Pre-Polymer

A more detailed procedure is outlined by Galhenage et al.[25], but a general example follows for the synthesis of the amphiphilic isocyanate-functional pre-polymer. For the preparation of five different pre-polymer compositions, as shown in Table 1, the ratio of wt. % for PDMS:mPEG ranged from 20:0, 15:5, 10:10, 5:15, and 0:20, for a total of 20 wt. % of mPEG and/or PDMS in the pre-polymer composition.

TABLE 1

The pre-polymer compositions

| Pre-polymer Synthesis | PDMS:mPEG Ratio | | | | |
|---|---|---|---|---|---|
| Monocarbinol terminated PDMS - 10k MW | 20% | 15% | 10% | 5% | 0% |
| Hydroxy terminated PEG monomethyl ether - 750 MW | 0% | 5% | 10% | 15% | 20% |
| Total Wt. % of SiPU Composition: | | | 20% | | |

For all pre-polymers, monocarbinol terminated PDMS of 10,000 MW and mPEG of 750 MW were used. To prepare 30 g of total composition, mPEG (1.5000 g) was added to a 100 ml plastic cup along with ethyl-3-ethoxyproprionate (EEP, 1.5000 g). The mPEG was dissolved and then PDMS (1.5000 g) was added to the mixture and vortexed vigorously for 3-5 minutes. Lastly, isophorone diisocyanate (IPDI, 1.6491 g) and catalyst solution (DBTDAc 1 wt. % in MAK, 0.2079 g) was added to the mixture, vortexed for 3-5 minutes, and stirred overnight for 24 hours. The isocyanate to total hydroxyl ratio was kept at 3:2 for all pre-polymer syntheses. A representative structure of the pre-polymers is shown in Scheme 2.

Scheme 2: General structure of the pre-polymers, where "X" could either be chains of mPEG, PDMS, or unreacted isocyanate for further coating crosslinking

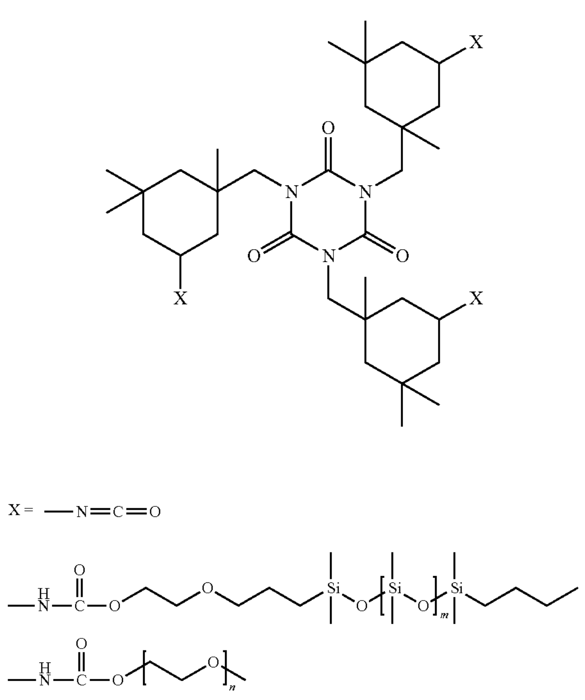

Pre-Polymer Isocyanate Titrations

To confirm the presence of isocyanate groups after pre-polymer synthesis, isocyanate titrations were performed. These were performed after pre-polymer solutions were stirred for 24 hours and a general procedure is as follows. To a 250 mL Erlenmeyer flask, 0.3-0.5 g of pre-polymer was added and diluted with 100 mL of isopropanol. Then, 25 mL of 0.1 N dibutyl amine solution in toluene was added, followed by an additional 25 mL of isopropanol. This solution was mixed for 15 minutes and then a few drops of bromophenol blue indicator solution was added. Using 0.1 N hydrochloric acid, the solution was titrated until an endpoint transition of blue to pale yellow. The amount of hydrochloric acid dispensed was recorded and a blank sample with no pre-polymer was also performed. Equation 1 was used to calculate the amount of remaining isocyanate content (% NCO) for the pre-polymer solutions.

Equation used to calculate % NCO for pre-polymers $$\%\ \mathrm{NCO} = \frac{4.202(B - S)N}{W \times \left(\frac{\text{percent solids}}{100}\right)} \qquad \text{Equation 1}$$

$B$ = volume (mL) of 0.1N HCl used in blank titration $S$ = volume (mL) of 0.1N HCl used in sample titration $W$ = sample weight (g)

$N$ = concentration of HCl (0.1)

Fourier-Transform Infrared Spectroscopy

To further assess the presence of remaining isocyanate on the pre-polymers, FT-IR was performed using a Thermo Scientific Nicolet 8700 FT-IR spectrometer. Liquid pre-polymer samples were spread over a potassium bromide optical disk and placed in the instrument after obtaining a background spectrum.

Coating Compositions

Fifteen amphiphilic SiPU coating compositions of the invention (F1-F15) were prepared using varying amounts of the exemplified SMAA and pre-polymers, as shown in Table 2. A general procedure of composition F9 for preparing coatings from pre-polymers is as follows. After 24 hours of stirring the pre-polymer solution, additional IPDI (5.5635 g), a 50% by wt. in toluene, 80:20 BA:HEA acrylic polyol (14.4879 g), and pot-life extender acetylacetone (0.3000 g). Also, the SMAA chosen for these compositions had a siloxane backbone of 900-1200 MW with 45-55 mol % Si—H functionality, and grafted mPEG chains of 350 MW. This SMAA was added into the coating compositions along with the other components at either 5 or 10 wt. %. For composition F9, the SMAA at 10 wt. % total solids (1.6919 g) was added and the whole mixture was vortexed vigorously for 3-5 minutes, and then stirred for 1 hour. The isocyanate to total hydroxyl equivalents was kept at 1.1:1.0. After 1 hour, the compositions were cast on both 3"×6" or 4"×8" primed aluminum panels using a gardco #80 wire drawdown bar. The coated panels were left to cure at ambient temperatures for 24 hours and then placed in an oven at 80° C. for 45 minutes.

TABLE 2

The amphiphilic SiPU compositions analyzed via biological assays and surface characterization techniques

| Composition | Prepolymer PDMS % - 10k MW | Prepolymer mPEG % - 750 MW | SMAA wt. % |
|---|---|---|---|
| F1 | 20 | 0 | 0 |
| F2 | 20 | 0 | 5 |
| F3 | 20 | 0 | 10 |
| F4 | 15 | 5 | 0 |
| F5 | 15 | 5 | 5 |
| F6 | 15 | 5 | 10 |
| F7 | 10 | 10 | 0 |
| F8 | 10 | 10 | 5 |
| F9 | 10 | 10 | 10 |
| F10 | 5 | 15 | 0 |
| F11 | 5 | 15 | 5 |
| F12 | 5 | 15 | 10 |
| F13 | 0 | 20 | 0 |
| F14 | 0 | 20 | 5 |
| F15 | 0 | 20 | 10 |

Attenuated Total Reflectance FT-IR (ATR-FT-IR)

ATR-FT-IR was performed on cured coated panels for compositions F1, F4, F7, F10, and F13 which contained no SMAA and had changes in PDMS:mPEG composition. Additionally, spectrums were obtained from compositions F3, F6, F9, F12, and F15 which contained 10 wt. % of the SMAA. The objective was to confirm the absence of NCO peaks to denote a cured coating and observe the change in surface composition relative to the change in pre-polymer composition and SMAA incorporation. A Thermo Scientific Nicolet 8700 FT-IR spectrometer, with a Smart iTR ATR sampling accessory, was used to gather spectrums. Panels were placed coated side down on the optical window and spectrums were obtained after a background determination was performed.

Water Contact Angle (WCA) Analysis

Analysis of WCA was performed for a couple reasons. The first was to observe the change in contact angle (decreasing) as the amount of mPEG in the pre-polymer composition was increased. The second reason was to observe the change in contact angle when SMAA's were incorporated at both 5 and 10 wt. %. If the SMAA's were present in sufficient amounts, the contact angle would be expected to decrease more with increasing wt. %. Water contact angle measurements were gathered for all compositions using an FTA100 series dynamic contact angle analyzer. Measurements were taken in 2 minute intervals for 10 minutes. A 3"×6" primed aluminum panel, coated with the compositions, was placed on the sample platform and a drop of distilled water was placed on the top, middle, and bottom portions of the panel. The values at each time interval were averaged and their standard deviation calculated.

Methylene Iodide Contact Angle (MICA) Analysis/Surface Energy Calculation

Analysis of MICA was performed for the same reasons as WCA analysis and performed much in the same way. A FTA100 series dynamic contact angle analyzer was used to gather all measurements. These measurements were taken in 2 minute intervals for 10 minutes by placing a drop of MI onto the coatings surface at the top, middle, and bottom portions of the panel. Values at each time interval and location were averaged and standard deviation calculated. Using the Owens-Wendt method with values for WCA and MICA, the surface energy was calculated at each time interval over the course of 10 minutes and represented as mN/m.

Atomic Force Microscopy

AFM was performed on compositions F1, F4, F7, F10, and F13 which contained no SMAA. The objective was to observe the change in surface morphology when the PDMS: mPEG composition was changed from 20 wt. % PDMS, 0 wt. % mPEG to 0 wt. % PDMS and 20 wt. % mPEG. Additionally, compositions F3 and F15 were scanned to determine any changes in surface morphology due to incorporation of the SMAA. A general procedure is as follows. Sample panels were placed on the sample holder of a Dimension 3100 microscope with Nanoscope controller. A silicon probe (HQ:CSC37/AIBS) with resonant frequency of 20-40 kHz and a spring constant of 0.3-0.8 N/m from MikroMasch was affixed to the instrument and calibrated. An area of 100×100 μm was scanned in air and phase images and surface phase plots were gathered.

Water Ageing

Before submitting samples for biological assays, all compositions were placed in circulating water tanks for at least 28 days. After this time, panels were removed from water immersion, rinsed with DI water and dried overnight. Upon inspection, all coatings retained a smooth surface with only minor loss of "slippery" feeling. Coatings with incorporated SMAA had an oilier surface suggesting the presence of SMAA still at the surface. Water contact angle analyses were again performed according to previous methods and compared to that of measurements before 28 days water immersion. Additionally, small disks were punched out from coated panels to be used in *C. lytica, N. incerta*, and *U. linza* biological assays. 4"×8" primed aluminum panels coated with compositions were used as is for *G. demissa* and *A. amphitrite* macrofouling biological assays.

Water Contact Angle Analysis—After 28 Days Water Ageing

Again, WCA measurements were performed on samples at three different positions (top, middle, and bottom) of coated panels, and at 2 minute intervals for 10 minutes. A FTA100 series dynamic contact angle analyzer was used for all measurements. The values at each position on the panel were averaged and standard deviation was calculated. The procedure was similar to WCA analysis before water ageing.

Methylene Iodide Contact Angle (MICA) Analysis/Surface Energy Calculation—After 28 Days Water Ageing Measurements were again taken using an FTA100 series dynamic contact angle analyzer in the same manner as with WCA measurements. Surface energy calculations were made at each time interval using the averages of WCA and MICA using Owens-Wendt method.

*C. lytica*—24 Hr Biofilm Growth and Adhesion

While a more detailed procedure can be found in previous literature[26, 27], generally, after 28 days water ageing, disks punched out of experimental panels were glued into plastic 24-well plates and leachate toxicity was assessed by introducing bacterium to overnight extracts of each coating (with ASW and nutrients) and evaluating growth after 24 hours via crystal violet colorimetric assay. The growth of the bacterium in coatings leachates was reported as absorbance ratio (600 nm) to a growth control. Negative controls were extracts with growth medium, bacterium, and triclosan. After leachate toxicity, biofilm growth and retention assays were performed. A 5% suspension of *C. lytica* in ASW and nutrients (~$10^7$ cell/mL) was prepared and 1 mL was added to each well of the coating plates. These plates were incubated statically for 24 hours at 28° C. Plates were then rinsed with DI water and stained with crystal violet. Images were taken after staining and crystal violet was extracted with 33% acetic acid and the eluates were measured for absorbance at 600 nm. The biofilm retention was reported as the mean absorbance values of three replicate samples with error bars representing one standard deviation of the mean. Lastly, water jet adhesion was carried out after 24 hours of biofilm growth. The first column of each plate was not treated and served as the amount of biofilm before water jetting. The second and third columns were jetted for 5 seconds at pressures of 10 and 20 psi respectively. The biofilm adhesion was reported as a function of biomass remaining on the material surface after treatment with each pressure indicated above. The error bars represent one standard deviation of the mean.

*N. incerta*—2 Hr Cell Attachment and Adhesion

While a general procedure is outlined below, with more detailed explanations found in previous literature[26, 28] leachate toxicity was performed by introducing algae into overnight extracts from the coatings wells with ASW and nutrients. The growth was evaluated after 48 hours via fluorescence of chlorophyll. The growth in coating leachates was reported as a fluorescence ratio to a growth control. A negative growth control consisting of medium, algae, and triclosan was also included. After leachate toxicity, cell attachment was assessed by diluting algae to an OD of 0.03 at 660 nm in ASW and nutrients. 1 mL was added to each well of the plate and allowed to incubate statically for 2 hours. After this time, the amount of algae cell attachment was quantified by fluorescence measurement of DMSO extracts of chlorophyll. The attachment was reported as fluorescence intensity (relative fluorescence units RFU). The error bars represent one standard deviation of the mean. The adhesion strength was measured by spraying one column for 10 seconds at 10 psi, and another at 20 psi. The algal adhesion was reported as a function of biomass remaining on the material surface after treatment with the pressures indicated. Error bars represent one standard deviation of the mean.

Attachment and Release of Macroalgae *U. linza* Spores

Control coatings for this biological assay were composition F7 with no SMAA wt. % or change in PDMS:mPEG composition, Intersleek® 1100 SR and Silastic™ T2 silicone elastomer as commercial controls, and polystyrene surface and a generic polyurethane coating as negative controls. A more detailed procedure is outlined in previous literature.[29] Generally, multiwell plates were equilibrated in 0.22 μm filtered ASW for 2 hours. Next, to each well, 1 mL of spores of *U. linza* suspension adjusted to $3.3\times10^5$ spores/mL (0.05 OD at absorbance 660 nm) in single strength enriched seawater medium was added. The spores were allowed to settle on the plates and grow for 7 days inside an illuminated incubator at 18° C. with a 16:8 light/dark cycle (photon flux density of 45 μmol/m/s) with renewal of nutrients performed every 72 hours. After 7 days, generated biomass was assessed from a single row of wells from each plate. Then, the three remaining wells were sprayed with a spinjet apparatus at 18, 67, or 110 kPa and biomass remaining was compared to the row of wells not sprayed. To assess the biomass, chlorophyll was extracted with 1 mL of DMSO and fluorescence was determined at excitation of 360 nm and emission at 670 nm. Fluorescence (RFU) intensity is directly proportional to biomass present on coatings surfaces.

*G. Demissa*-3-Day Mussel Attachment and Adhesion

Marine mussel *G. demissa* attachment and adhesion was performed according to a previously established procedure.[25] First, compositions in Table 2 were prepared and cast on 4"×8" primed aluminum panels, and then immersed in circulating water tanks for 28 days. After this period, the panels were taken out, dried, and placed in the testing apparatus. Marine mussels *G. demissa* were provided by Duke University Marine Laboratory, Beaufort, N.C., USA. Once received, 4-cm long acetal plastic rods were attached to the mussels, perpendicular to the ventral edge with 3M acrylic adhesive. During the evaluation, six mussels for each coated panel were immobilized onto the surface by placing a plastic sheet over the attached rods. The coatings with immobilized mussels were then moved to artificial seawater (ASW) aquarium tanks for three days whilst being fed daily with live marine phytoplankton. Intersleek® 700, 900, and 1100SR were also used as commercial controls. Afterwards, the coatings were removed and the number of mussels which had attached byssal threads to each surface was recorded. Then, the plastic rod on each mussel was individually attached to a custom 5 N load cell and pulled off at a rate of 1 mm/s. The force required for removal of all byssal threads was recorded and averaged. No attached mussels represent coated surfaces with good mussel resistance.

*A. amphitrite*-2-Week Barnacle Reattachment and Adhesion

Previous procedures for performing this macrofouling biological assay are described by Stafslien et al.[30, 31] Compositions in Table 2 were again prepared and cast on 4"×8" primed aluminum panels and immersed in circulating water tanks for 28 days. Afterwards, six adult barnacles (*A. amphitrite*), provided by Duke University, were dislodged from their silicone substrates and immobilized onto the coated panels. They were allowed to reattach and grow for a period of 2 weeks after being placed in ASW aquariums with daily feedings of *Artemia nauplii*. To assess adhesion strength, individual barnacles were pushed off in shear with a hand-held force gauge on a semi-automated platform. Peak force was measured for each barnacle and their basal plate area was recorded using Sigma Scan Pro 5.0 imaging software. Adhesion strength (MPa) from each of the six barnacles were calculated by taking the ratio of the force for removal to basal plate area and averaged. Additionally, the number of barnacles that reattached over the total number of available barnacles was reported for each coating as well as recording any broken basal plates from barnacles reattached to the coatings. Due to issues with barnacle growth, and unfortunate death of many barnacles from prior shipments, limited coatings could be analyzed yet. Nevertheless, five compositions were chosen to be tested which included F3, F6, F9, F12, and F15, along with IS1100SR as commercial control. These compositions were selected because the incorporation of SMAA into these compositions was shown to improve fouling-release performance in other biological assays.

Results/Characterization

Table 3 shows that there is still remaining NCO content on all pre-polymers. However, there is a significantly lower % NCO for F1, as well as variation in amount % NCO for the other compositions. A possible explanation for this would be that the monocarbinol terminated PDMS and the hydroxyl terminated mPEG have differing reactivity towards NCO groups on the IPDI trimer. Still, compositions were able to be cast based on these values.

TABLE 3

Theoretical and actual % solids and % NCO for all pre-polymers with varying PDMS:mPEG compositions

| Composition | Theoretical | | Actual | |
|---|---|---|---|---|
| (PDMS:mPEG) | % Solids | % NCO | % Solids | % NCO |
| F1 (20:0) | 49.70376 | 0.240781 | 49.22518 | 0.086955 |
| F4 (15:5) | 51.37623 | 0.74467 | 49.74834 | 0.446702 |
| F7 (10:10) | 53.99611 | 1.175092 | 50.8961 | 0.829339 |
| F10 (5:15) | 54.804 | 1.504385 | 52.10793 | 0.98286 |
| F13 (0:20) | 55.71053 | 1.741625 | 52.7626 | 1.149164 |

From the FTIR spectra shown in FIG. 1, a couple of notable peaks were observed. At ~2300 $cm^{-1}$ are peaks in compositions F4, F7, F10, and F13 that represent isocyanate functional groups. It was very difficult to see this peak in F1, and changes in peak intensity throughout the rest of the compositions may again be explained by the differing reactivities of PDMS and mPEG with the isocyanate on IPDI trimer. In addition to the resultant NCO peaks, a couple other peaks of interest appeared. The first is ~800 $cm^{-1}$ and represents the Si—C bond, seen in chains of PDMS. This peak showed up prominently in F1, F4, and F7, but began to disappear in F10 and 13. This confirms the change in pre-polymer composition, as the amount of PDMS decreases in compositions, with 0 wt. % of PDMS in F13, where no Si—C peak is observed. The same observation was observed with —Si—O—Si— peak ~1100-1000 $cm^{-1}$ and the —C—O—C— peak ~1100 $cm^{-1}$. In summary, FT-IR also helped confirm the presence of remaining NCO on the pre-polymer, as well as the compositional changes of PDMS and mPEG through the different pre-polymer compositions.

Figure 2:
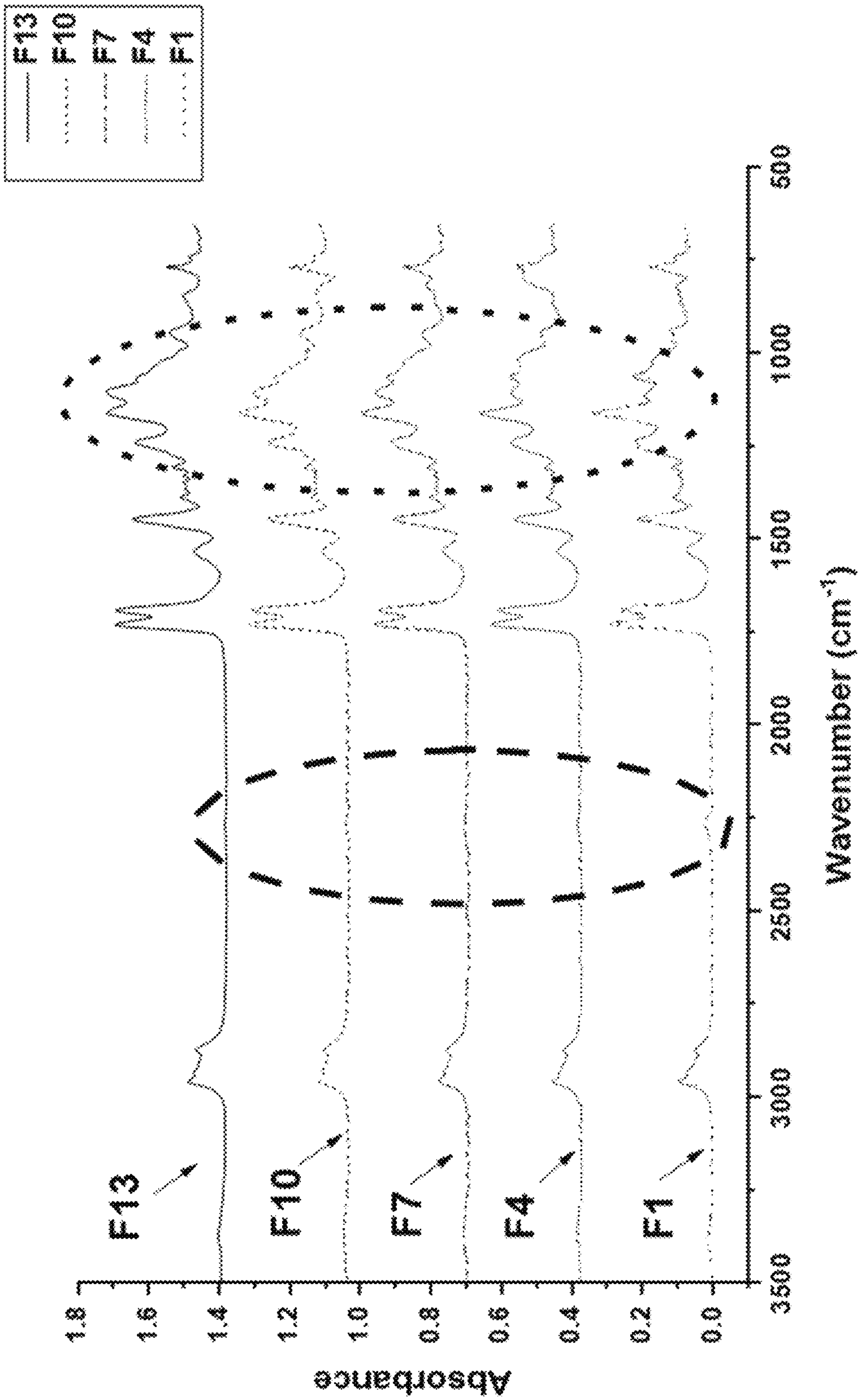
FIG. 2 shows the ATR-FTIR spectra for compositions F1, F4, F7, F10, and F13 with no added SMAA wt. %. The dashed circle indicates an insignificant amount of NCO signal ~2250 $cm^{-1}$. The dotted circle indicates the increase in —C—O—C— peak ~1100 $cm^{-1}$.

From the spectra in FIG. 2, there is an insignificant amount of NCO left on the surface of the coatings, meaning films were successfully cured. In addition to this it was shown that the surface composition changes to become more mPEG dominant. It is difficult to resolve many of the peaks in the region ~1100-1000 $cm^{-1}$, but a clear peak ~1100 $cm^{-1}$ increases which is indicative of —C—O—C— stretching.

Figure 3:
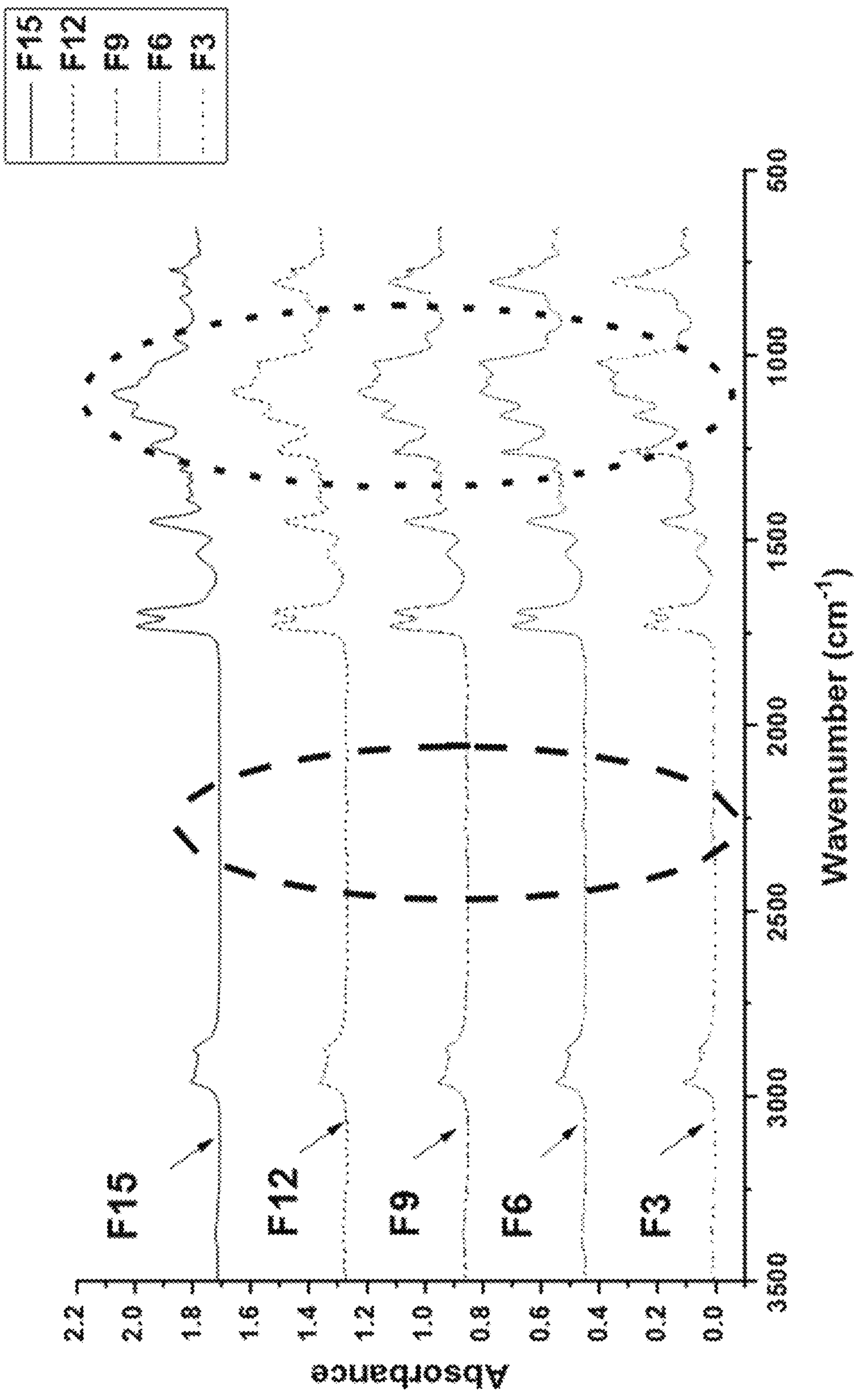
FIG. 3 shows the ATR-FT-IR spectrum for compositions F3, F6, F9, F12, and F15 with 10 wt. % added SMAA. The dashed circle indicates an insignificant amount of NCO signal ~2250 $cm^{-1}$. The dotted circle indicates the change in PDMS:mPEG composition, as well as the presence of SMAA due to overlapping peaks of —C—O—C— and —Si—O—Si— ~1100-1000 $cm^{-1}$ in all formulations.

FIG. 3 shows an insignificant NCO peak, signifying a successfully cured film. Also, the changes in PDMS:mPEG pre-polymer composition were observed, as in FIG. 2, but the peaks were not as defined due to the incorporation of the SMAA. This additive contains both PDMS and mPEG chains and therefore, if this additive is at the surface of the coating, peaks for the Si—C stretching, —Si—O—Si—, and —C—O—C— should be observed. As highlighted by the dotted circle, this overlapping of peaks for PDMS and mPEG is indeed observed in all compositions with 10 wt. % incorporation of SMAA. The siloxane stretching peaks were dominant, and more clearly observed in F3 and F6 than in F12 and F15 due to their pre-polymer PDMS content at 20 wt. % and 15 wt. % respectively. mPEG peaks were more dominant and observed more clearly in F12 and F15 as opposed to the others due to the pre-polymer mPEG composition at 15 wt. % and 20 wt. % respectively. However, one observation for all compositions was the presence of both PDMS and mPEG peaks despite pre-polymer composition, most likely due to the presence of SMAA on the surface of the coating.

Figure 4:
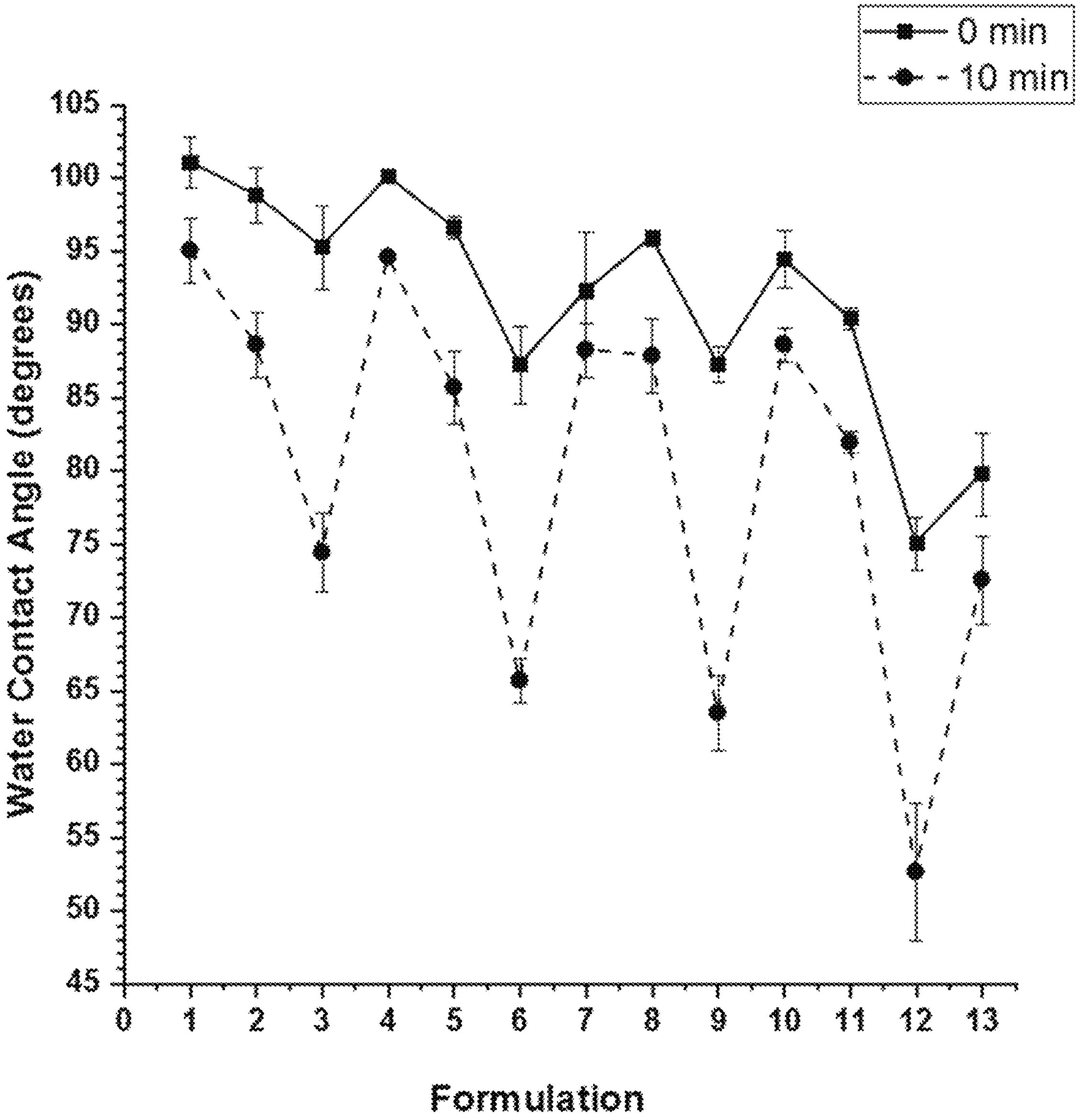
FIG. 4 shows the dynamic water contact angles for compositions F1-F13 before 28 days water immersion. Water completely wet coatings F14 and F15.

From the measurements in FIG. 4, a couple observations were made. First, when the mPEG pre-polymer composition was increased through the compositions, there was a slight decrease in contact angle. The most significant difference was when the pre-polymer composition consists solely of mPEG with no PDMS. Also, there was no significant surface activity, that is, large decrease in water contact angle over a time period of 10 minutes in compositions without SMAA. However, a significant drop in contact angle occurred over 10 minutes when SMAA was incorporated in both 5 and 10 wt. %, with 10 wt. % showing the most significant drops in contact angle. This suggests that the SMAA is present in these coating compositions and mPEG chains are "inflating" at the surface, lowering the water contact angle. This was observed even in pre-polymer compositions where there was no mPEG, such as F1-F3. Lastly, compositions F14 and F15 had the highest mPEG content, as well as 5 and 10 wt. % SMAA, respectively. Once the water droplet was dispensed on the panel, the contact angle could not be measured, and was effectively completely wetting the surface.

Figure 5:
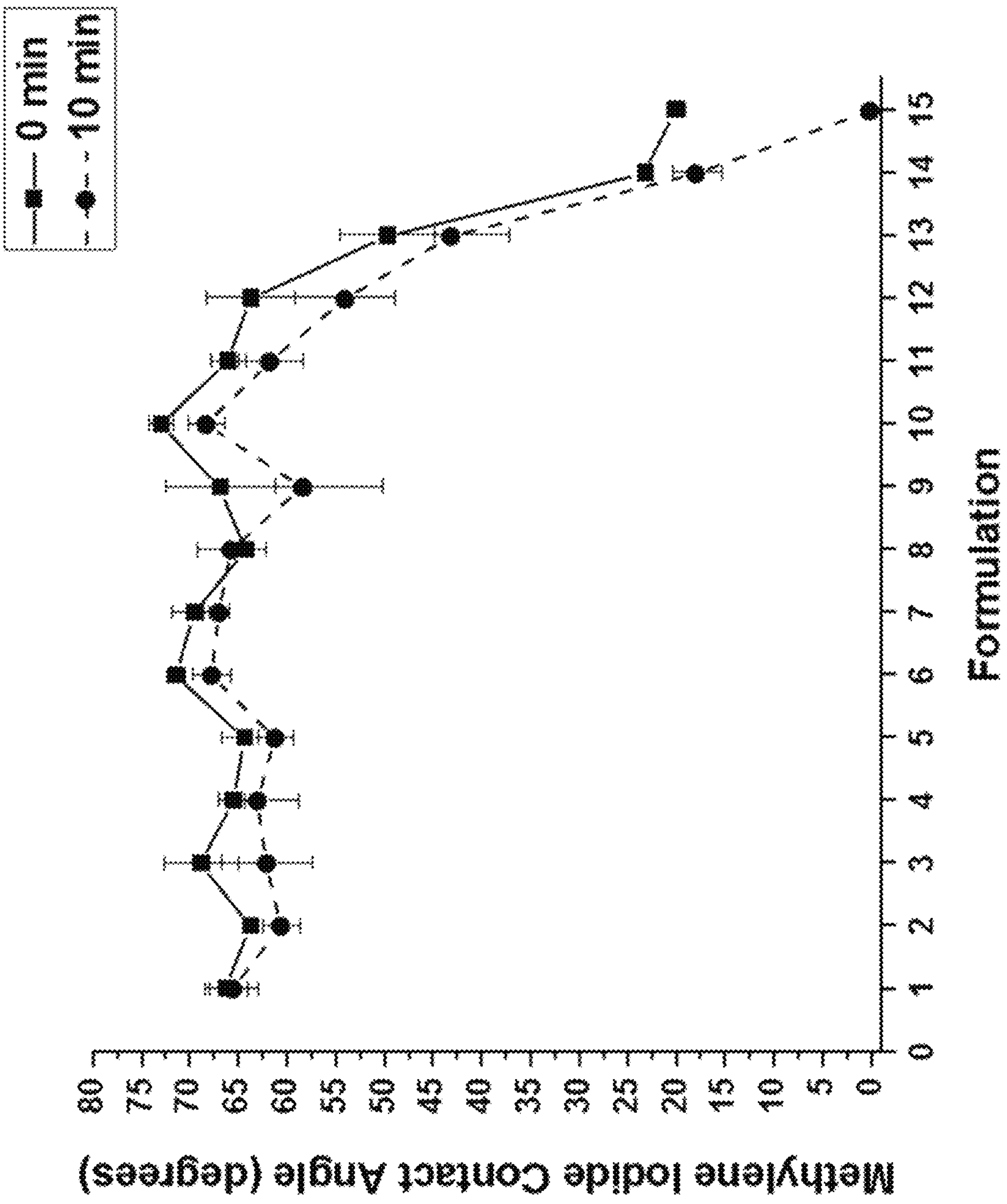
FIG. 5 shows the measurements for methylene iodide contact angle (MICA) at 0 minutes and at 10 minutes for compositions F1-F15.

Methylene iodide contact angle (MICA) measurements were taken, in addition to WCA, to calculate surface energies of compositions F1-F15 (FIG. 5). In contrast to water, being a polar liquid, methylene iodide is non-polar and thus hydrophobic components of the coating's surfaces will interact more strongly. Significant change in MICA was not observed in most of the compositions, however, as SMAA wt. % is increased, measured values decreased. This is especially apparent in compositions F14 and F15, which did not have any PDMS in the pre-polymer composition and was likely caused by the PDMS backbone on the SMAA.

Figure 6:
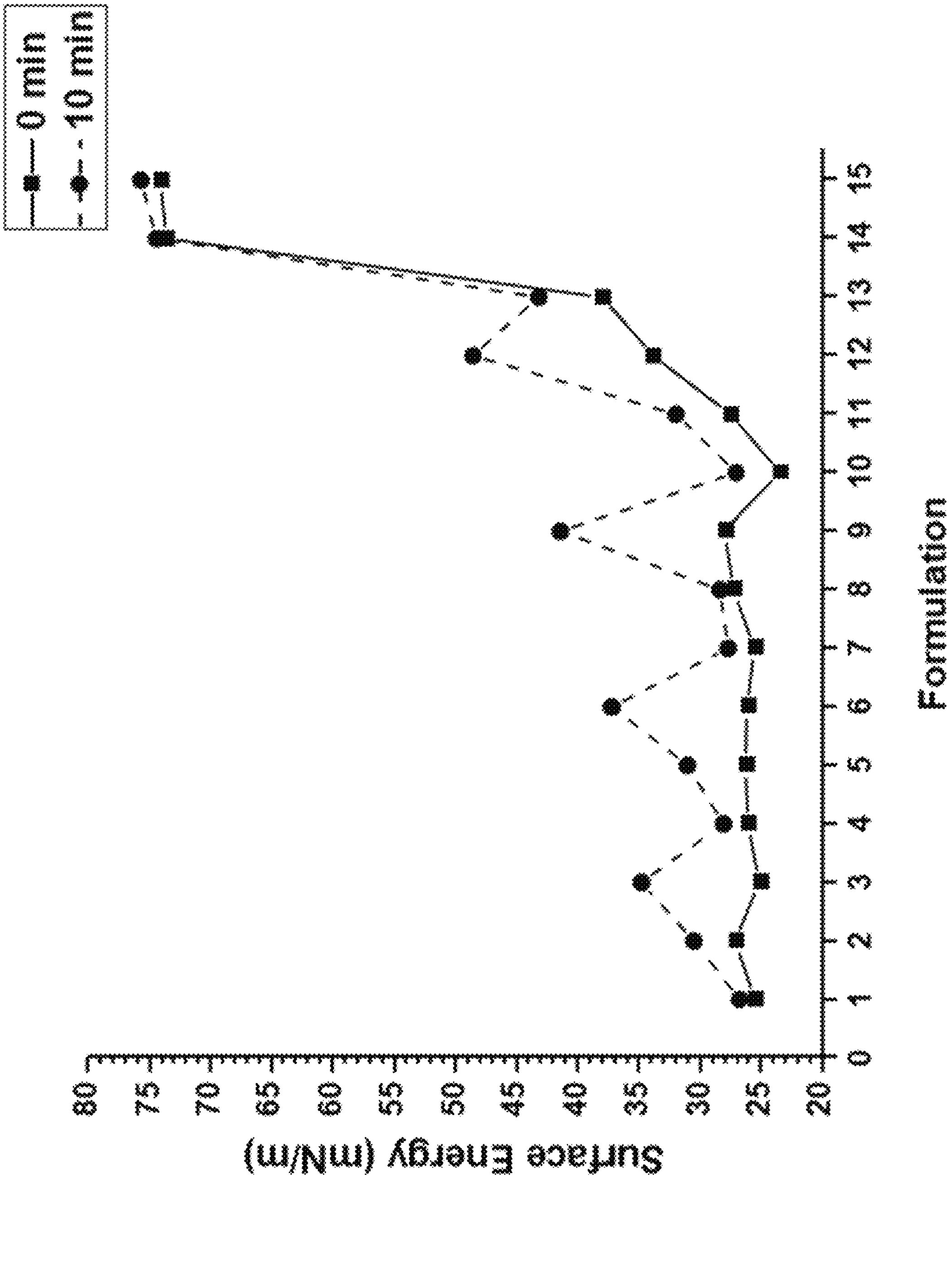
FIG. 6 shows the surface energies (mN/m) of compositions F1-F15 calculated using Owens-Wendt method at 0 min and after 10 min.

In FIG. 6, compositions F1, F4, F7, F10, and F13 do not have any added SMAA, and the PDMS:mPEG wt. % ratio changes from 20% PDMS and 0% mPEG to 0% PDMS and 20% mPEG in 5% incremental changes. These compositions, except for F13, had surface energies around 25 mN/m at 0 minutes, and after 10 minutes there was little change. F13 had a significantly higher surface energy of about 35 mN/m due to pre-polymer composition consisting of 20 wt. % mPEG and no PDMS content. This value increased to around 43 mN/m after 10 minutes likely due to the mPEG chains swelling at the surface. While the pre-polymer composition may not be significant in effecting surface energies, the addition of 5 and 10 wt. % SMAA was. At 5 wt. % SMAA, the surface energies increased after 10 minutes, with consistent rates across all compositions. At 10 wt. % SMAA incorporation this effect was increased, again remaining consistent across compositions. The only exception was that for F14 and F15, 5 wt. % and 10 wt. %, respectively, values did not change significantly due to their near complete wetting behavior. These increases in surface energy are explained by the action of SMAA within the coating matrix. Because the SMAA has both hydrophobic (PDMS) and hydrophilic (PEG) groups, the additive moves to the surface due to the low surface energy of PDMS, but then mPEG groups swell at the surface when exposed to aqueous environment, increasing surface energy. Hence, these additives are "surface active" within this siloxane-polyurethane coating system with varying amphiphilic content.

Figure 7:
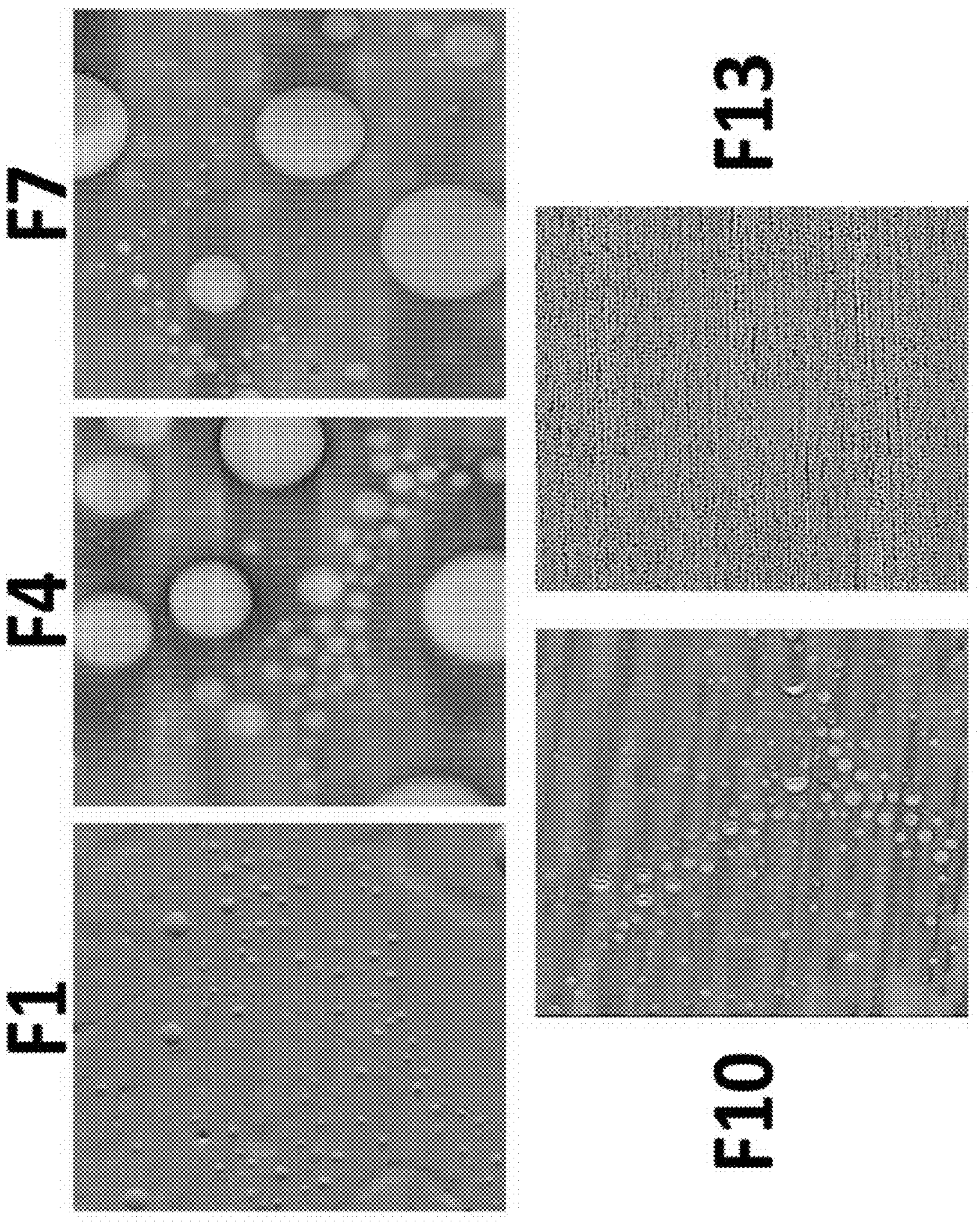
FIG. 7 shows the Atomic Force Microscopy phase images of compositions F1, F4, F7, F10 and F13 over a 100×100 μm area.

In FIG. 7, phase images of the chosen compositions are shown. All the imaged compositions did not have any incorporated SMAA. In F1, which has 20 wt. % PDMS with no mPEG in the pre-polymer, the surface was largely homogenous, with spheres appearing due to the oily nature of PDMS. As the mPEG content was increased in the pre-polymer composition, distinct phase domains were observed. In F4 and F7, which has 5 and 10 wt. % mPEG respectively, the lighter spheres are thought to be domains of PDMS. This heterogenous surface is thought to be due to the incompatibility between PDMS and mPEG. As the wt. % of mPEG in the pre-polymer continues to increase, the surface did not show a significant amount of lighter colored spheres indicating a large PDMS content. Instead, darker "streaks" began to appear, most likely due to increased mPEG content forming a harder phase than that of PDMS. This was observed in F10 and F13, with the most dramatic formations appearing in F13, which has 20 wt. % mPEG and no PDMS in the pre-polymer. From these phase images, it is clear to see that an increase in mPEG content in the pre-polymer composition has a significant effect on surface morphology.

Figure 8:
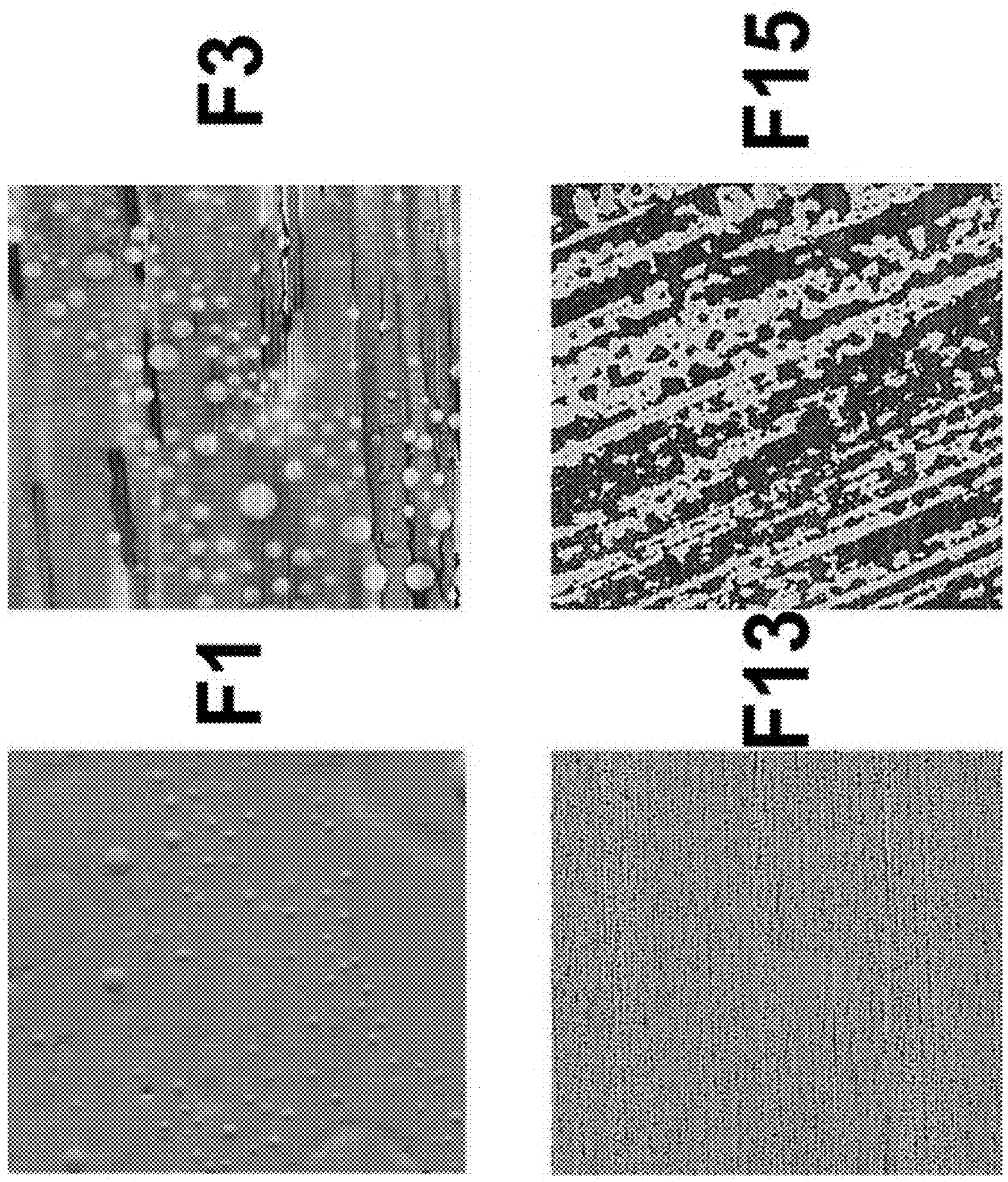
FIG. 8 shows the Atomic Force Microscopy phase images of compositions F1, F3, F13, and F15 over a 100×100 μm area.

In FIG. 8, compositions F1 and F13 represent pre-polymer compositions of 20 wt. % PDMS, 0 wt. % mPEG and 0 wt. % PDMS and 20 wt. % mPEG respectively, with no added SMAA. F3 and F15 represent those same pre-polymer compositions, but with 10 wt. % incorporated SMAA. Comparing F1 and F3, as the SMAA was incorporated, the homogenous surface in F1 showed larger amounts of phase separation. This suggests that the mPEG chains on the SMAA are potentially affecting the surface morphology due to the incompatibility between mPEG and PDMS. This effect was also observed between F13 and F15, where there is no PDMS in the pre-polymer of F13. In F13, smaller, darker streaks are thought to be domains of mPEG, but, in F15 with 10 wt. % SMAA with PDMS as the backbone, more pronounced phase separation was present. From these phase images, the SMAA is present at the surface of the coating, affecting its morphology as well.

Figure 9:
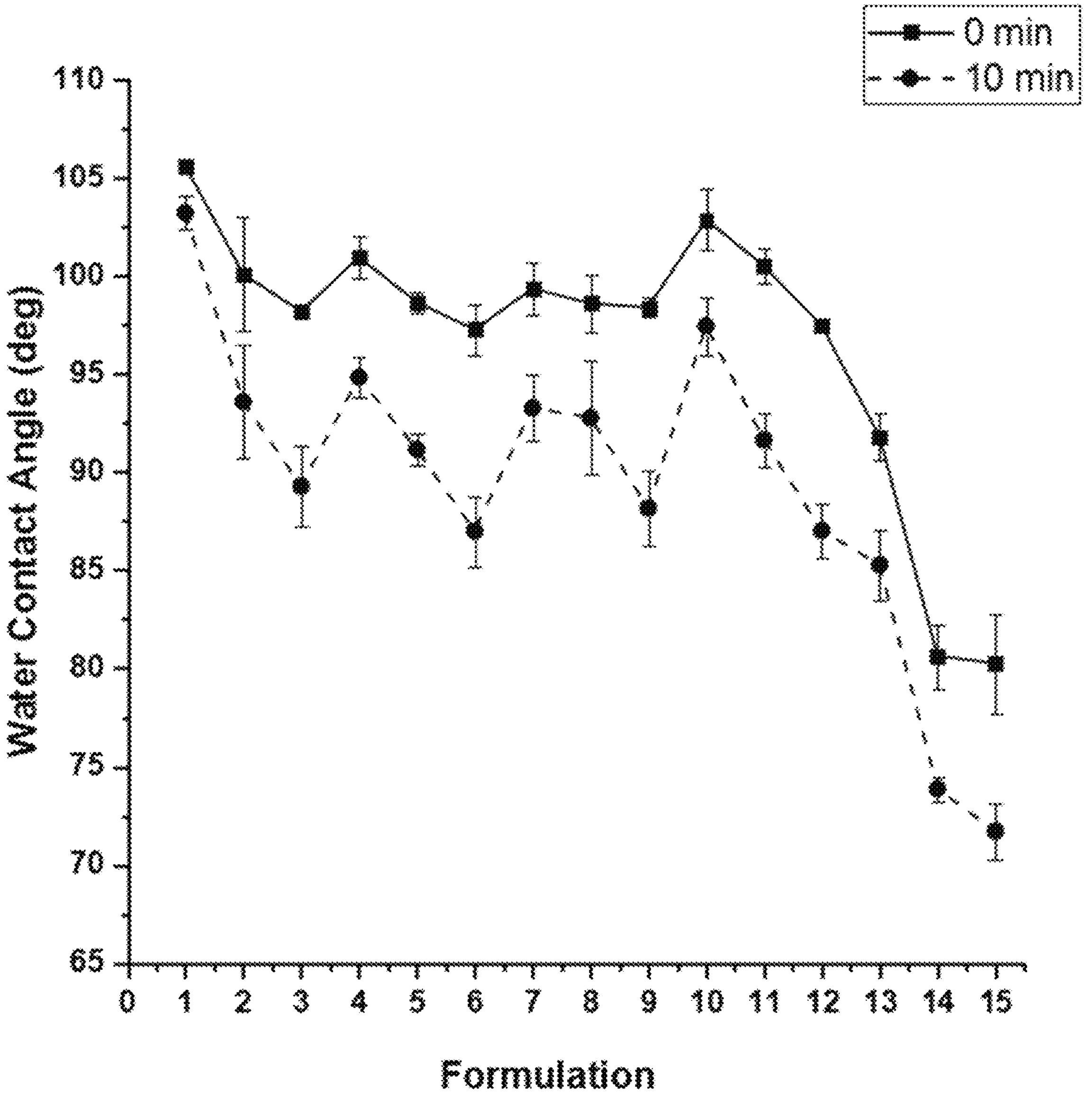
FIG. 9 shows the dynamic water contact angles for compositions F1-F15 after 28 days water ageing.

As with measurements performed before water ageing, the compositions where PDMS:mPEG pre-polymer composition changes showed a decrease in water contact angle as the amount of mPEG increases. There are some increases in overall contact angle, which may potentially be caused by prolonged exposure to an aqueous environment. This may cause an increase in hydrophobic character at the surface due to the PDMS being almost "stuck" at the surface, becoming less mobile through the film. For compositions containing SMAA at 5 and 10 wt. % loading levels, drops in contact angle over 10 minutes were still observed, but were much less significant than in measurements done before water ageing. Also, F14 and F15, which the water droplet had completely wetted the surface previously, now have contact angles ~80 degrees with little change over 10 minutes. These observations for compositions containing SMAAs may be explained by possible leaching of the additive. Because these additives are non-reactive, freely mixed with the binder, there is potential for loss to an aqueous environment. However, some surface activity was still observed. These WCA measurements are shown in FIG. 9.

Figure 10:
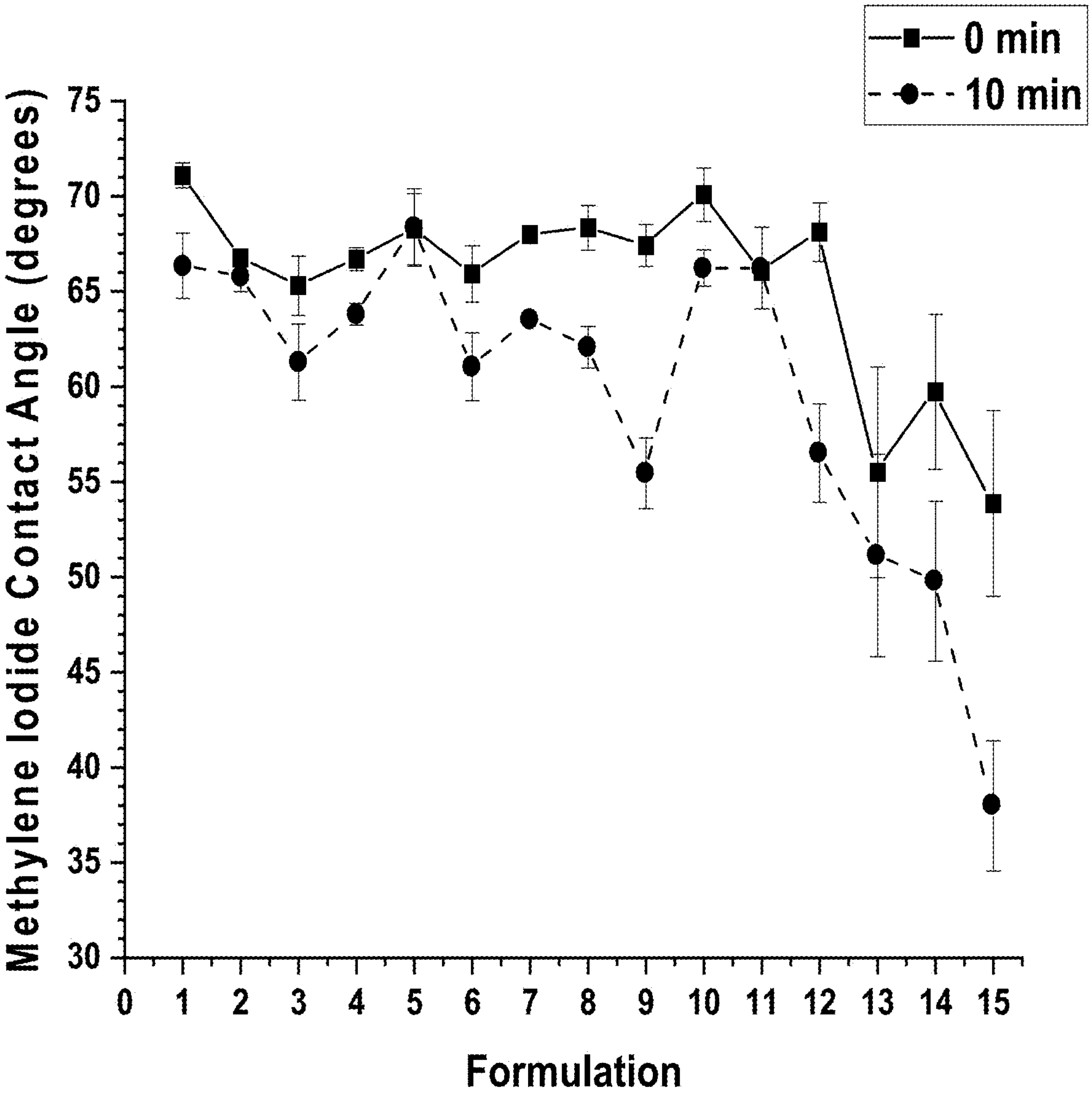
FIG. 10 shows the measurements for methylene iodide contact angle (MICA) at 0 minutes and at 10 minutes for compositions F1-F15 after 28 days water immersion.

After 28 days of water ageing, MICA measurements were again taken for all compositions (FIG. 10). Similar results occurred as with MICA values before water ageing. The larger decreases in MICA were observed with compositions containing more mPEG content and especially with SMAA incorporation at 5 and 10 wt. %.

Figure 11:
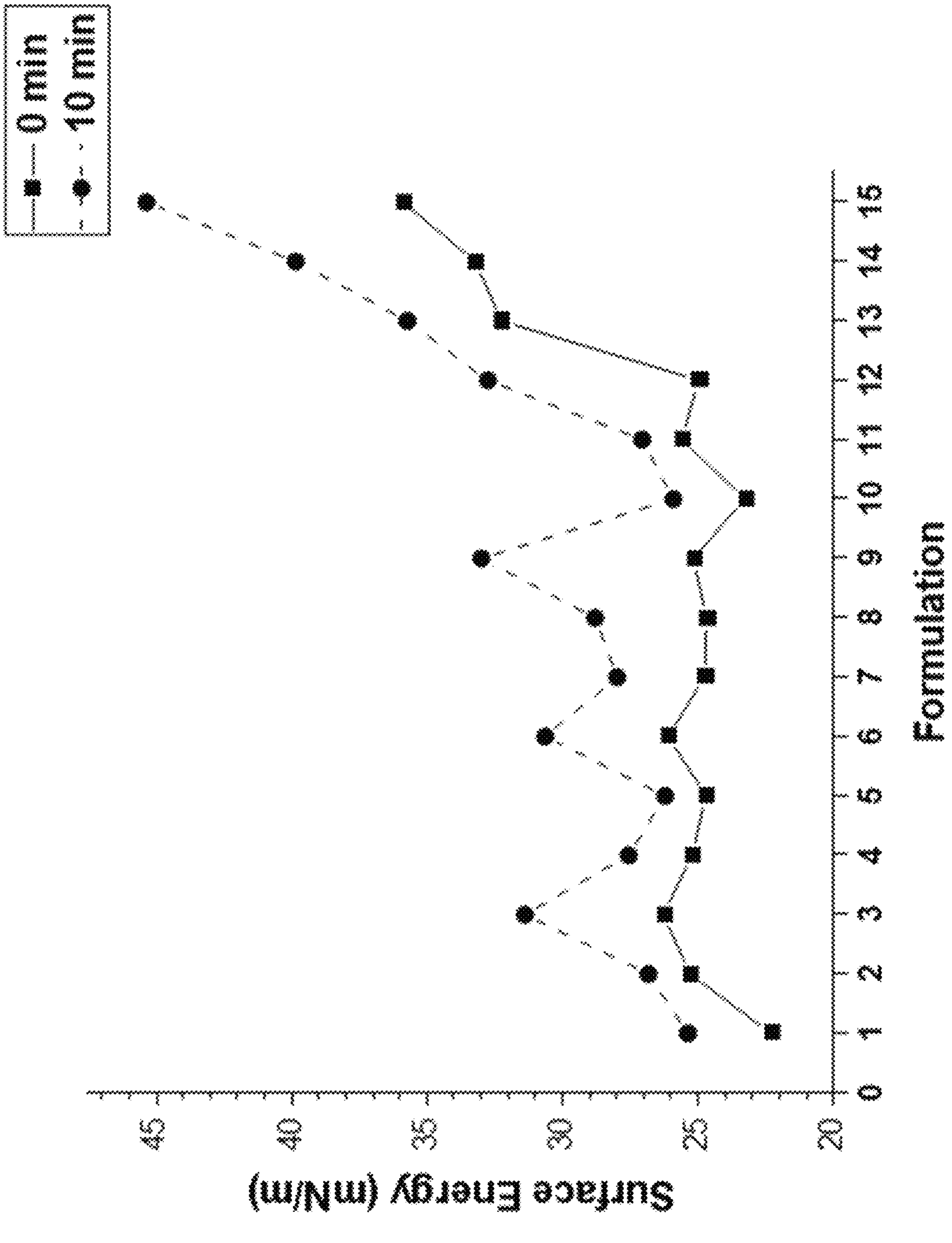
FIG. 11 shows the surface energies (mN/m) of compositions F1-F15 calculated using Owens-Wendt method at 0 min and after 10 min.

After water ageing and taking WCA/MICA measurements, surface energies in mN/m were again calculated for all compositions. Similar results as in FIG. 6 were observed in FIG. 11. Surface energies still did not show significant change between compositions without SMAA incorporation, both at 0- and 10-minute intervals. However, when SMAA was incorporated at 5 and 10 wt. %, more significant increases in surface energy were observed, again likely due to SMAA migration and mPEG chain swelling. One observation unique to calculations after water ageing is that F14 and F15 were no longer completely wetting, with lower surface energies at both 0 and 10 minutes. This is explained by possible leaching of SMAA or a large increase in hydrophobic content at the surface.

Figure 12:
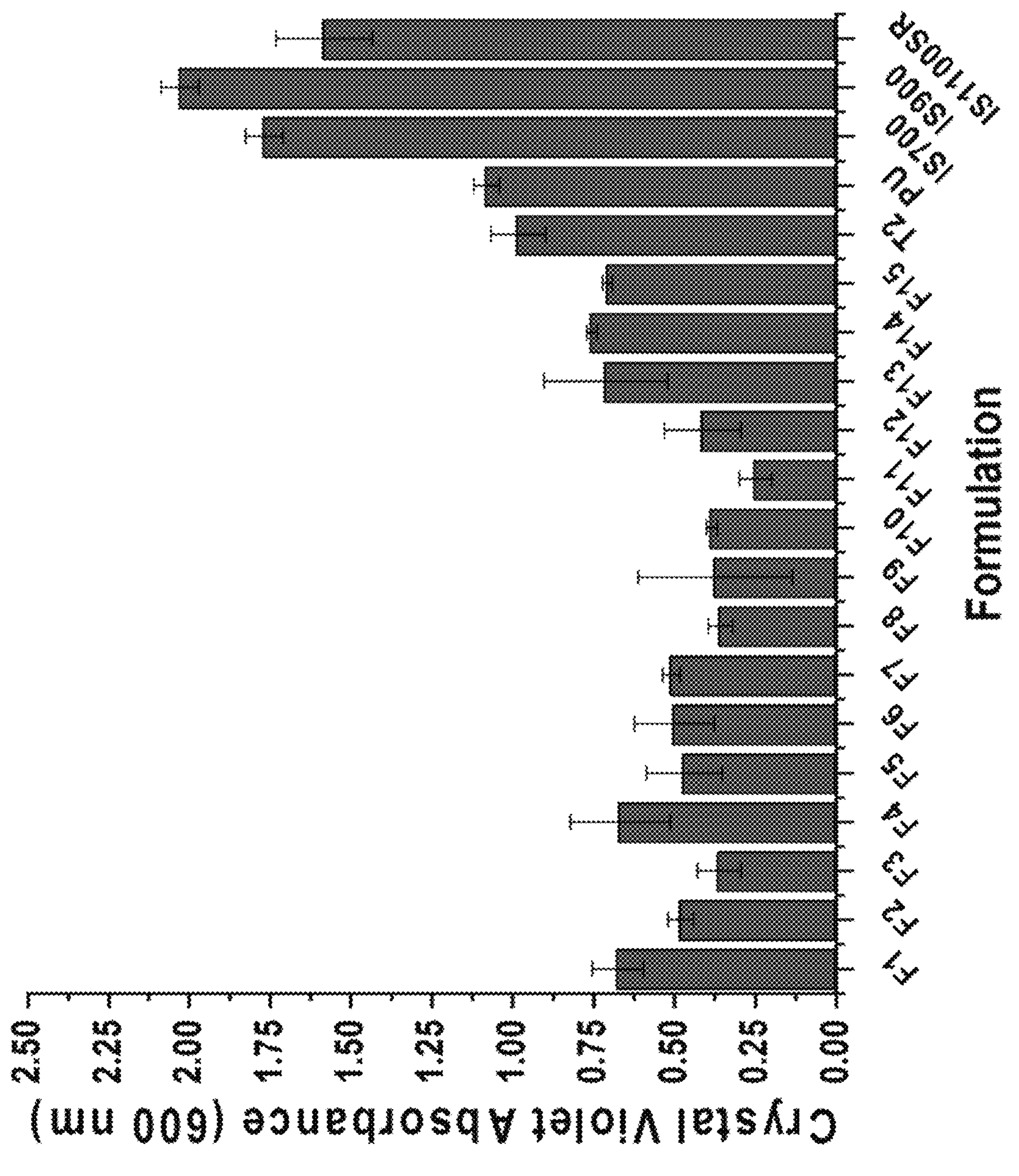
FIG. 12 shows the *C. lytica* 24-hr biofilm growth for compositions F1-F15 and control coatings Silastic™ T2 (T2), polyurethane (PU), Intersleek® 700 (IS700), Intersleek® 900 (IS900), and Intersleek® IS1100SR (IS1100SR).
Figure 13:
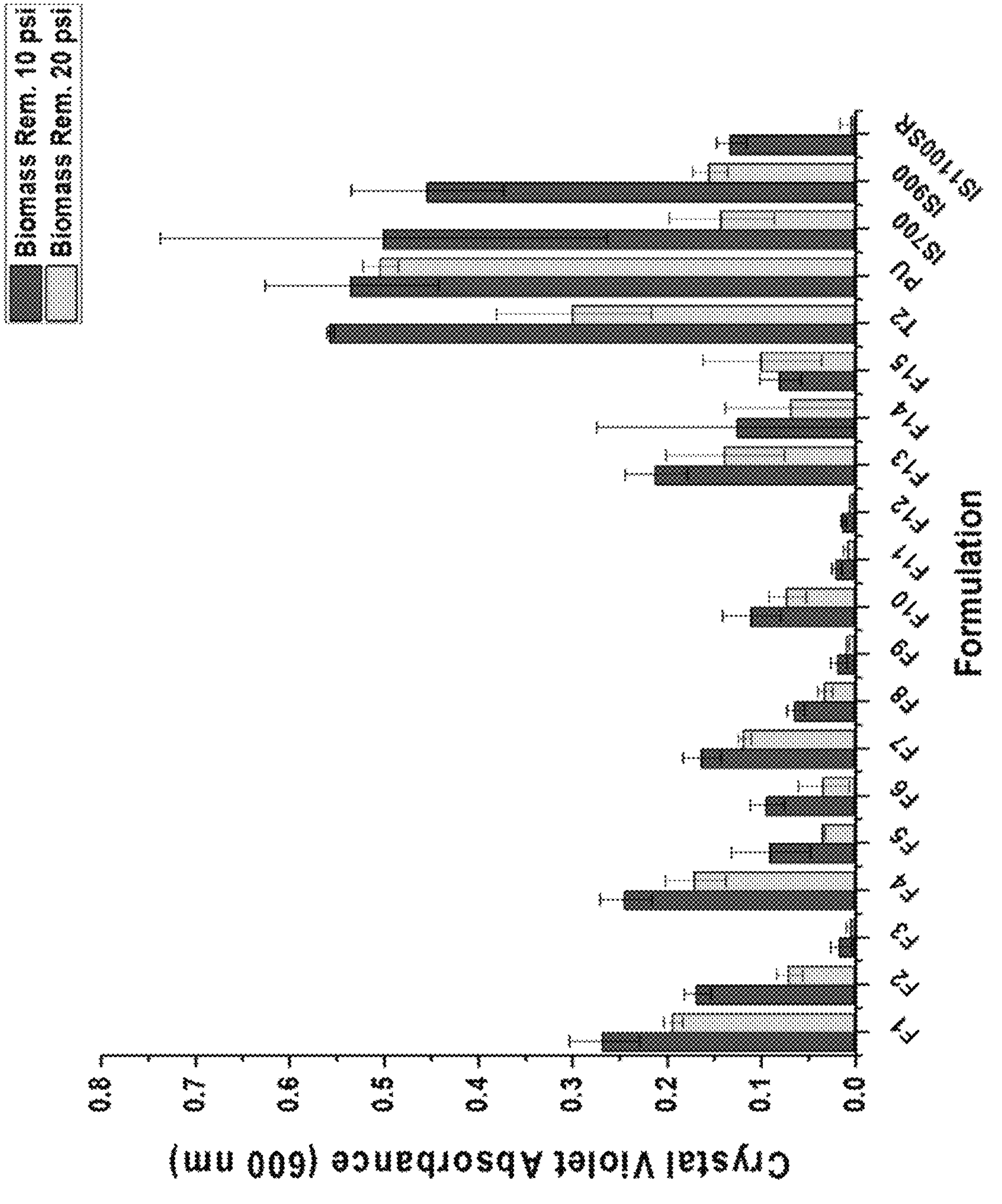
FIG. 13 shows the *C. lytica* 24-hr biofilm adhesion for compositions F1-F15, and control coatings T2, PU, IS700, IS900, and IS1100SR.

FIG. 12 shows the amount of biofilm growth on coating compositions F1-F15 and control coatings Silastic™ T2 (T2), PU, Intersleek® 700 (IS700), Intersleek® 900 (IS900), and Intersleek® IS1100SR (IS1100SR). All experimental coatings performed better than the controls, but a few trends were observed in terms of growth. One trend is that as the PDMS:mPEG pre-polymer composition changes to incorporate both components, growth is slightly decreased. This may be due to the more heterogenous surface resulting from domains of both PDMS and mPEG at the surface. Compositions with large amounts of either PDMS or mPEG performed the worst. As wt. % of the SMAA was increased, the only compositions showing a continual decrease in biofilm growth were F1-F3. FIG. 13 shows the amount of biomass remaining after spraying with a water jet at 10 and 20 psi. Most coating compositions performed better than all controls, with some being comparable to IS1100SR performance. One trend shown is that, again, as the PDMS:mPEG pre-polymer composition changed to incorporate amounts of both, better removal was observed. Another observation was a clear increase in fouling-release performance upon addition of the SMAA, with 10 wt. % loading level showing the most significant improvement in most coating compositions. Overall, the highly heterogenous surfaces performed better than either PDMS or mPEG dominant surfaces.

Figure 14:
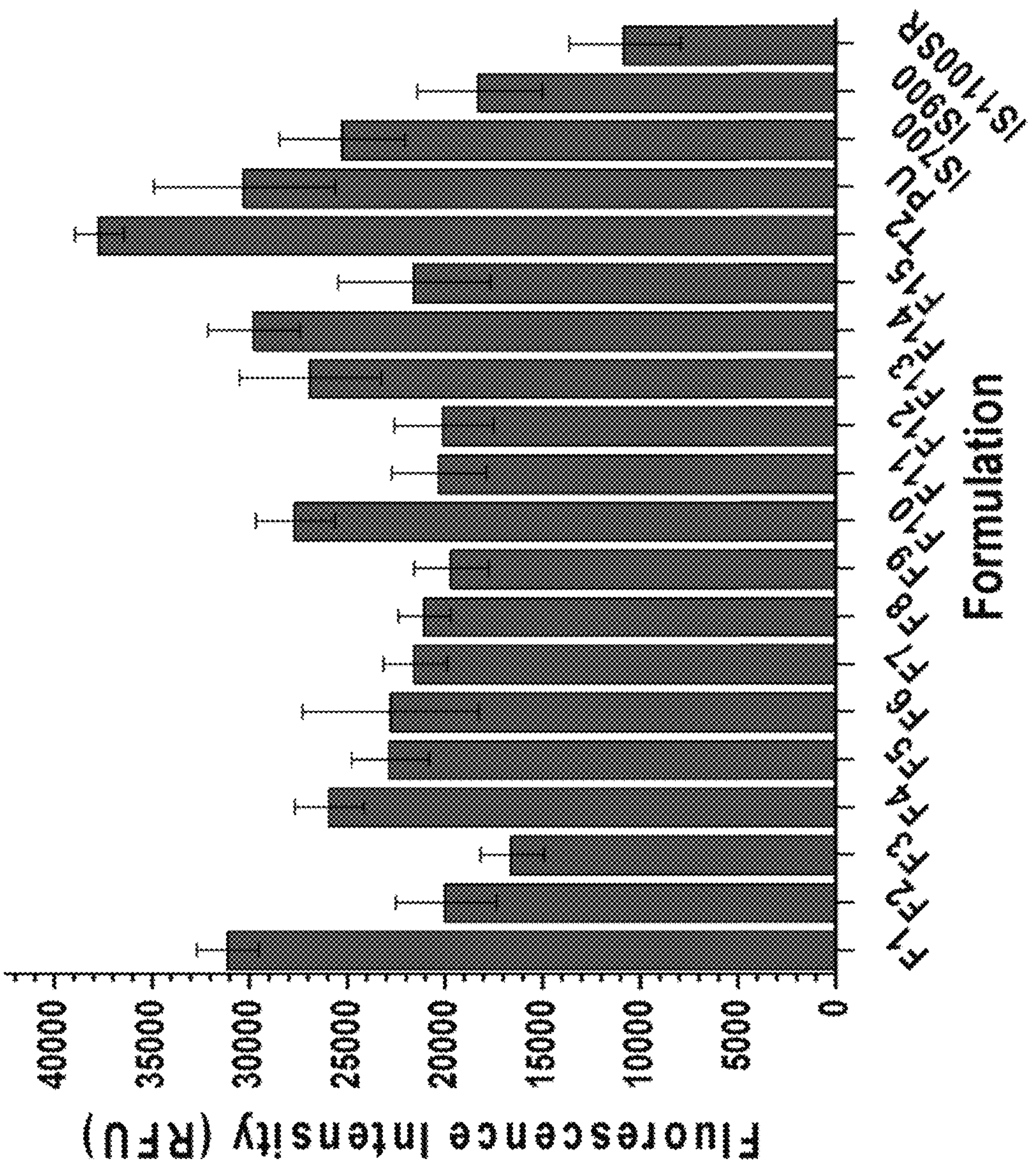
FIG. 14 shows the *N. incerta* 2 hr cell attachment for compositions F1-F15, and control coatings T2, PU, IS700, IS900, and IS1100SR.
Figure 15:
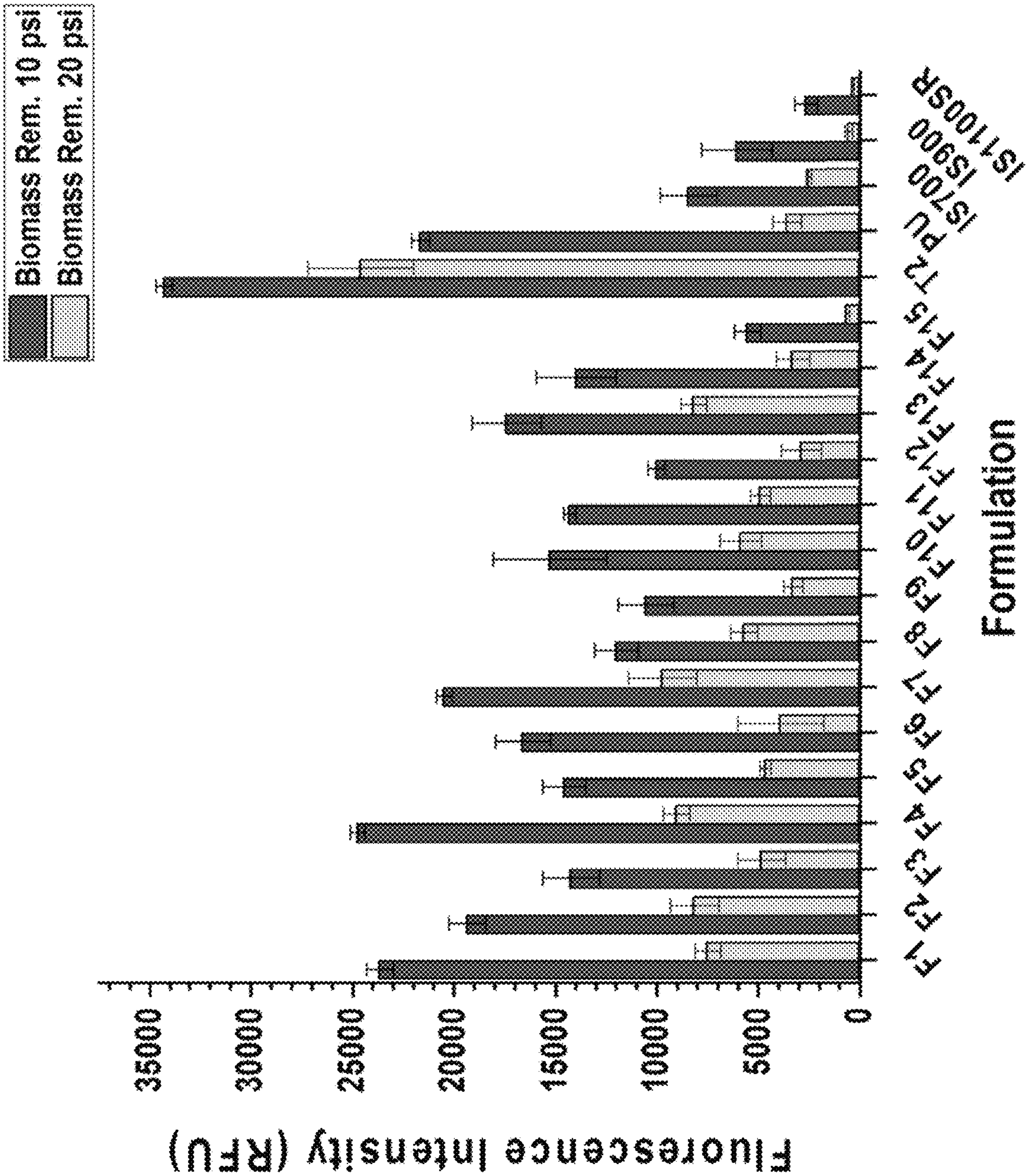
FIG. 15 shows the *N. incerta* 2 hr cell adhesion for compositions F1-F15, and control coatings T2, PU, IS700, IS900, and IS1100SR.

In FIG. 14, measurements for *N. incerta* cell attachment did not vary significantly. The diatom *N. incerta* has proven to be a difficult microorganism to protect against during previous work involving the self-stratified SiPU coatings at NDSU. This is largely due to its affinity for siloxane surfaces. According to the results of cell attachments, most of the experimental coatings also showed relatively high amounts of cell attachments compared to the commercial controls. However, SMAA incorporated at 5 and 10 wt. % in F2 and F3 decreased the number of cells attaching to the surface. This may be due to the introduction of mPEG chains, which are less favorable to the organism. But, in FIG. 15, the results for removal of the diatom provided a couple of observations. The first is that as the PDMS:mPEG pre-polymer composition was changed to incorporate less PDMS and more mPEG, the adhesion of the diatoms decreased gradually at lower pressures, with higher pressure of 20 psi not showing as significant of a trend. Additionally, as the SMAA was incorporated into all compositions, the adhesion of the diatom decreased significantly. The best performing compositions were those that contained 20 wt. % mPEG and 0 wt. % PDMS in the pre-polymer, with 5 or 10 wt. % SMAA.

Figure 16:
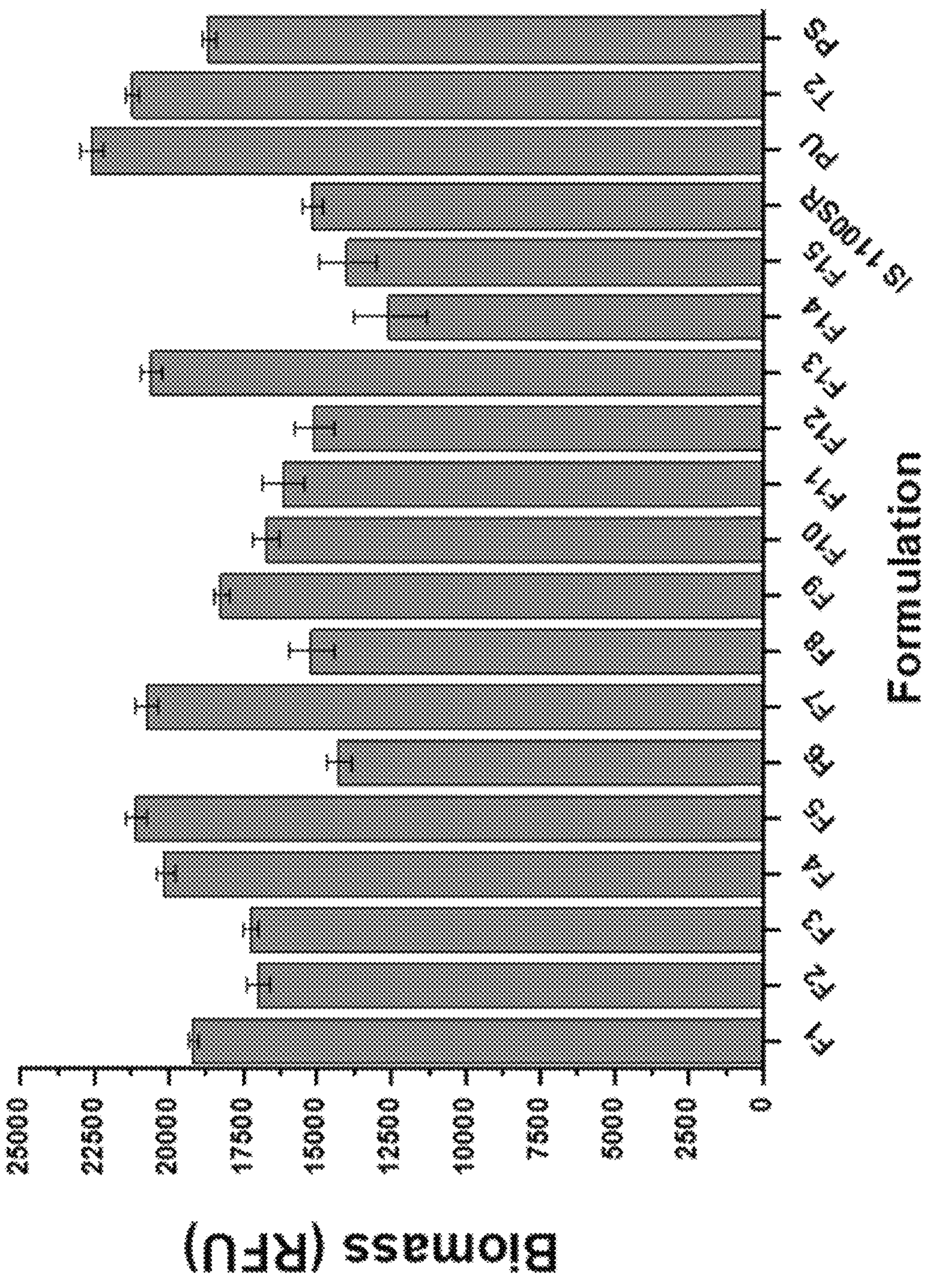
FIG. 16 shows the biomass of *U. linza* spore settlement for compositions F1-F15, and control coatings IS1100SR, PU, T2, and polystyrene (PS) for set A after 7 days' growth represented by relative fluorescence units (RFU).
Figure 17:
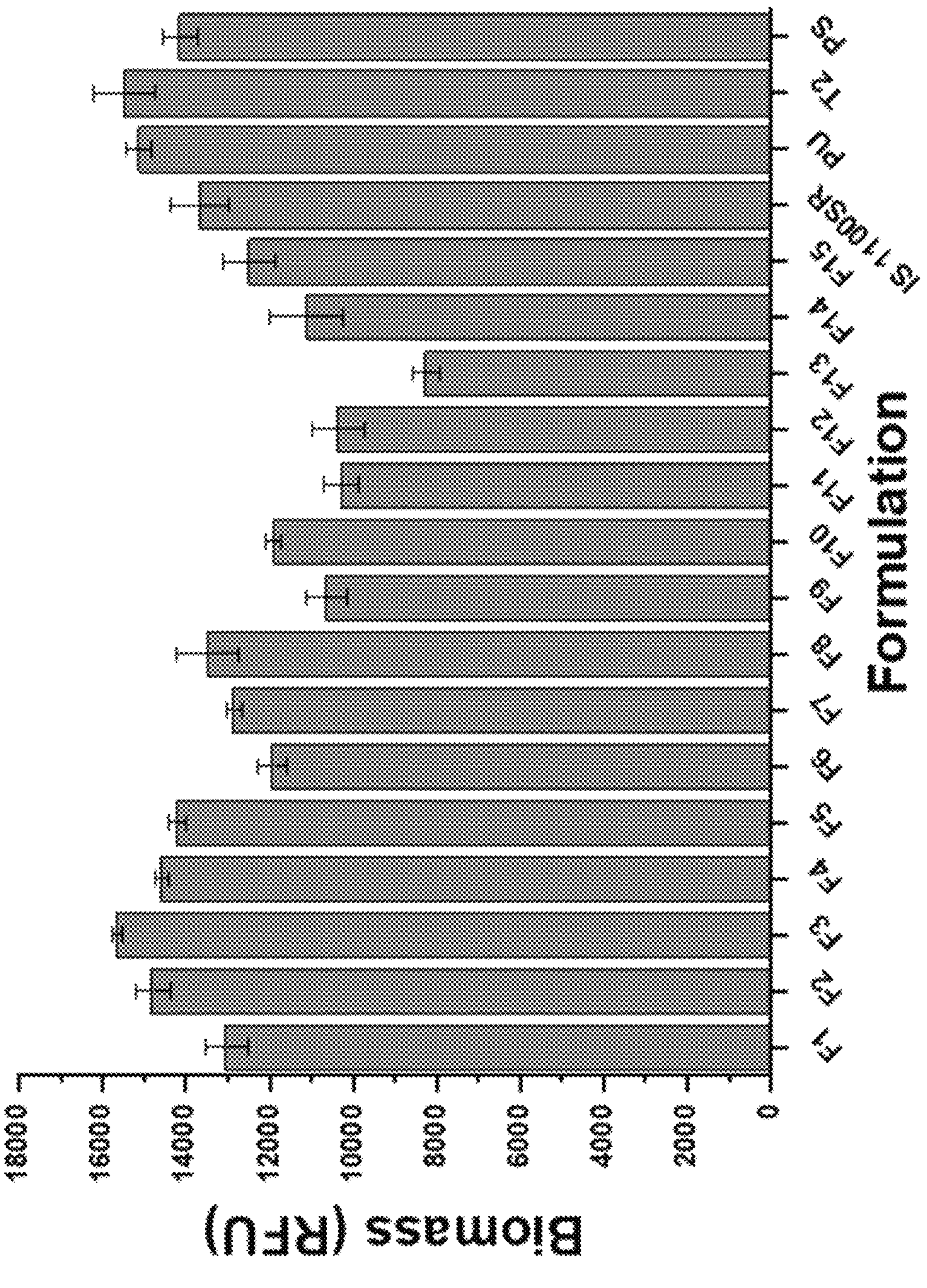
FIG. 17 shows the biomass of *U. linza* spore settlement for compositions F1-F15, and control coatings IS1100SR, PU, T2, and PS for set B after 7 days' growth represented by relative fluorescence units (RFU).

In FIG. 16 and FIG. 17, the biomass of *U. linza* spores that had settled on the coatings surfaces is shown for sets A and B. There is often great variability between batches of *U. linza*, hence the need for two or more sets. Coatings in set B showed an overall lower amount of settled biomass than set A coatings. No discernible trend in settlement was observed except that as the amount of mPEG was increased in both the pre-polymer composition or with coatings that had incorporated SMAA, the settlement of *U. linza* spores decreased, and sometimes had lower settlement than commercial and control coatings IS1100SR, PU, T2, and PS.

Figure 18:
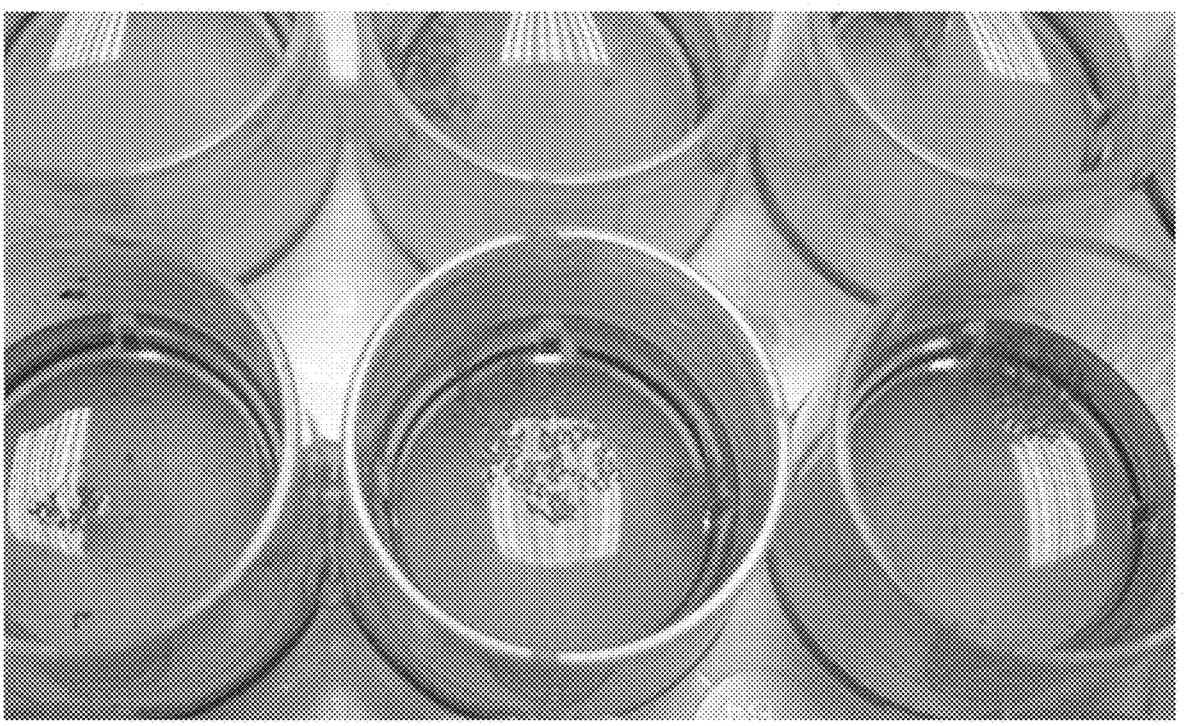
FIG. 18 shows the images of spores spontaneously detaching from wells of composition F9 before water-jetting.
Figure 18:
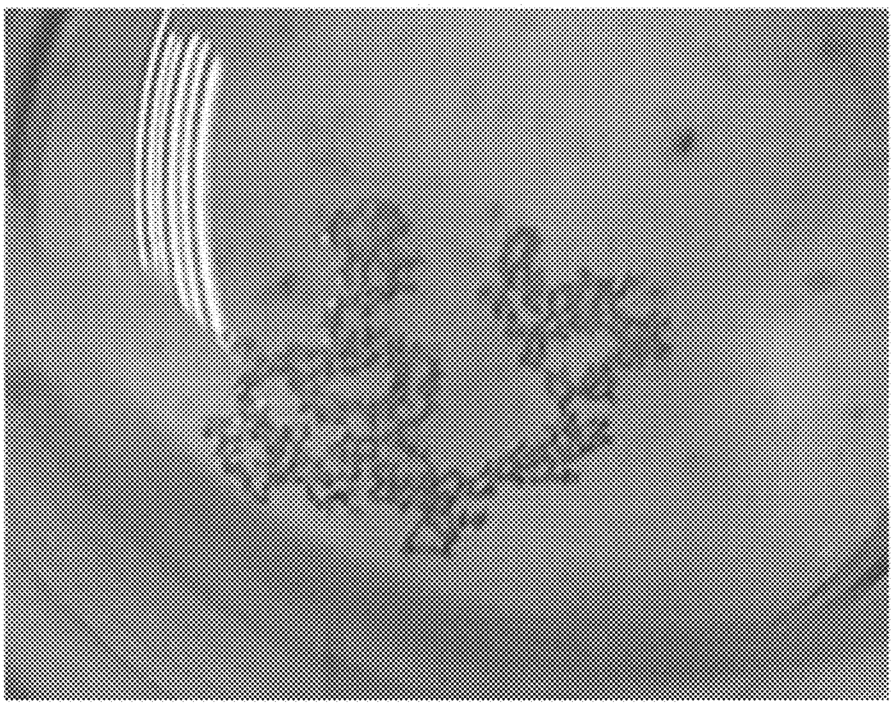

FIG. 18 shows pictures of wells for the coating composition F9, with 10 wt. % PDMS and mPEG with 10 wt. % SMAA. In these pictures, freely floating sporelings of *U. linza* are seen before being subjected to water-jetting. This suggests that these surfaces are highly unfavorable for prolonged attachment by sporelings.

Figure 19:
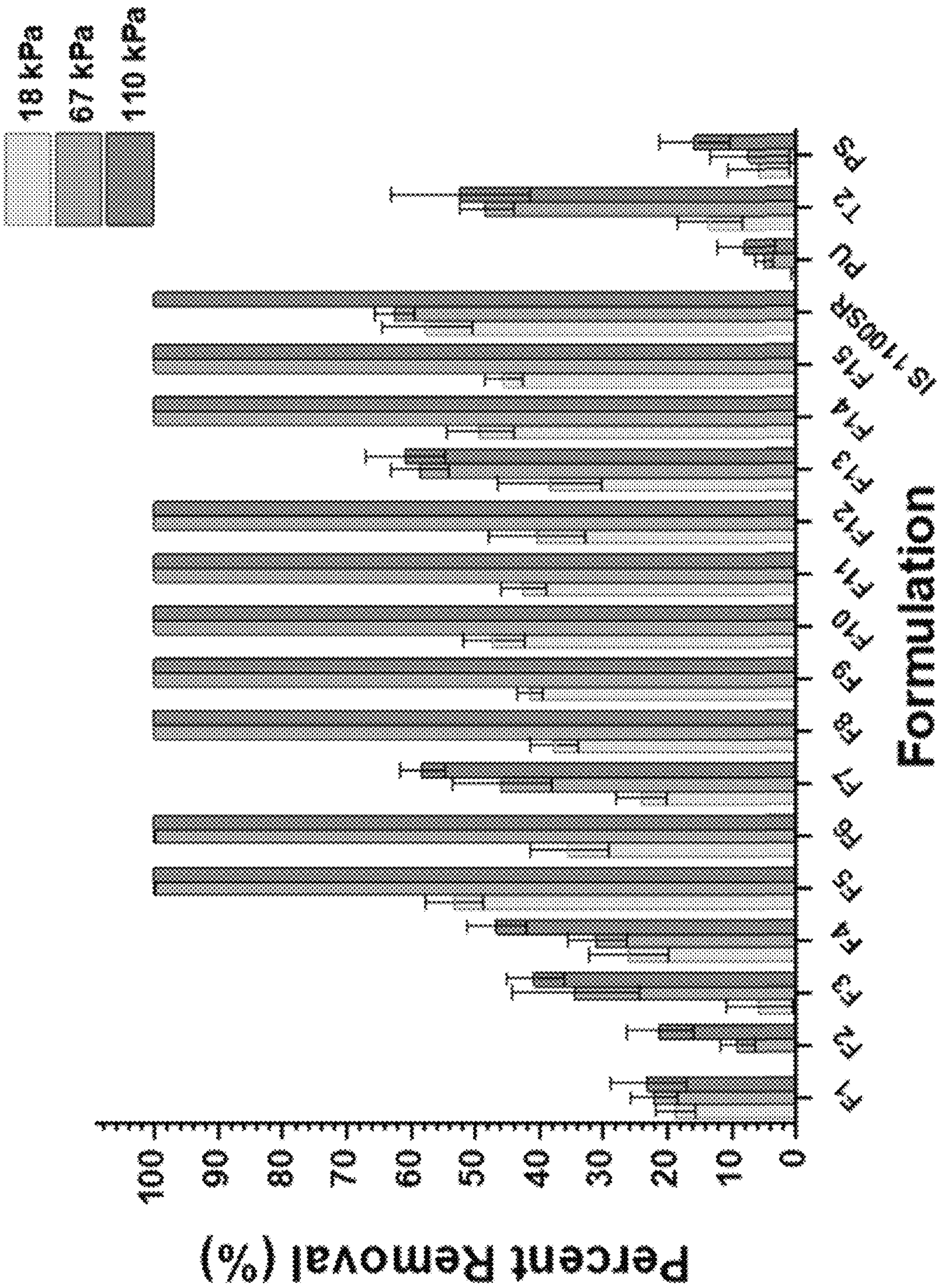
FIG. 19 shows the removal of *U. linza* sporelings for compositions F1-F15, and control coatings IS1100SR, PU, T2, and PS for set A after 7 days' growth, at 18, 67, and 110 kPa.
Figure 20:
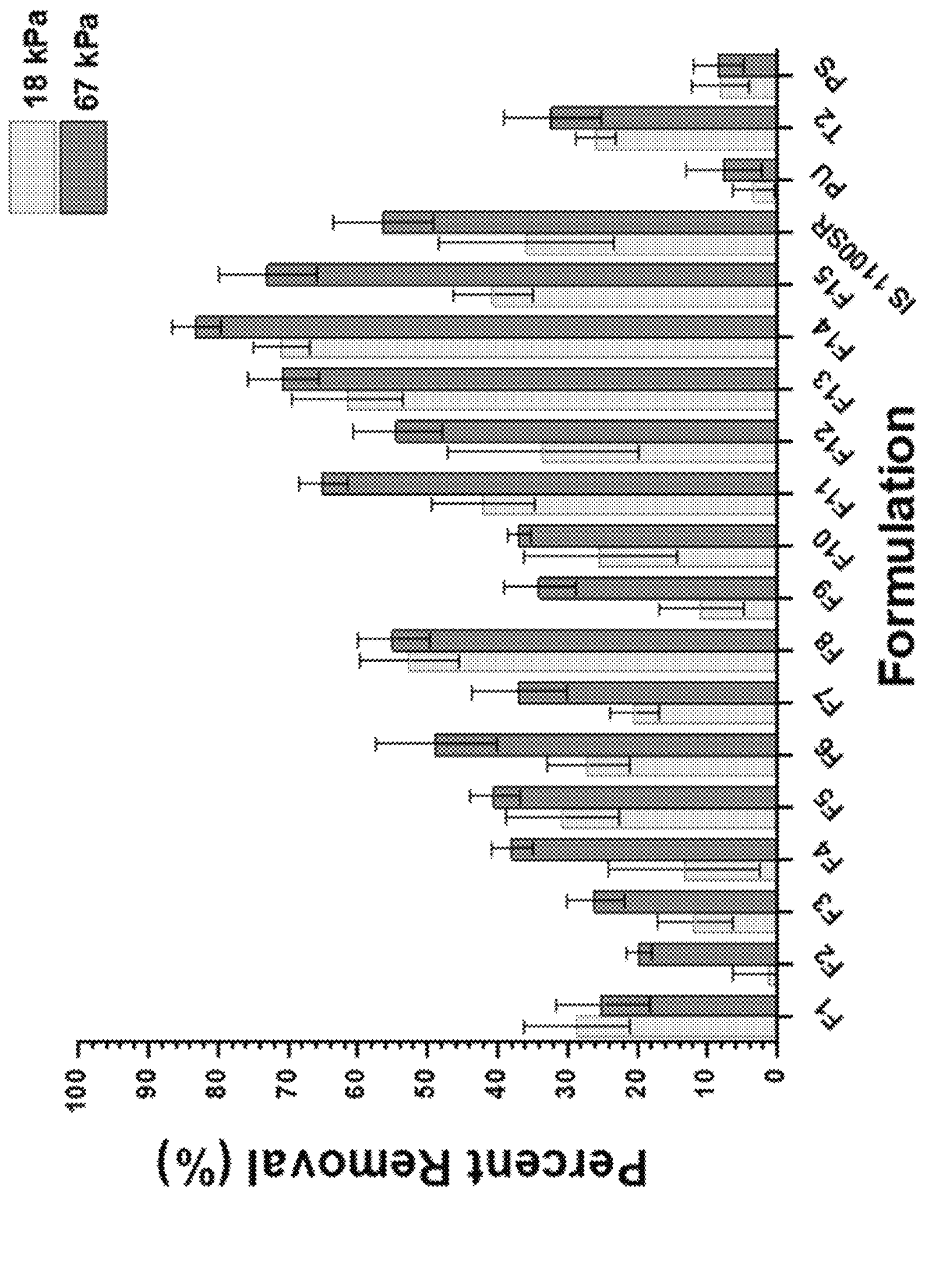
FIG. 20 shows the removal of *U. linza* sporelings for compositions F1-F15, and control coatings IS1100SR, PU, T2, and PS for set B after 7 days' growth, at 18, and 67 kPa.

A couple of key observations were made from the removal data of *U. linza* for these compositions (FIG. 19 and FIG. 20). First, from set A, it was very apparent that the introduction of the SMAA positively benefited the fouling-release performance of compositions towards *U. linza*. Second, lower pressures were used for coatings in set B to determine effects from composition of pre-polymer. By increasing the amounts of mPEG in the pre-polymer composition, the fouling-release performance towards *U. linza* increased. From these figures, some of the coating compositions outperformed IS1100SR (superior commercial control) at lower pressures in some cases.

Figure 21:
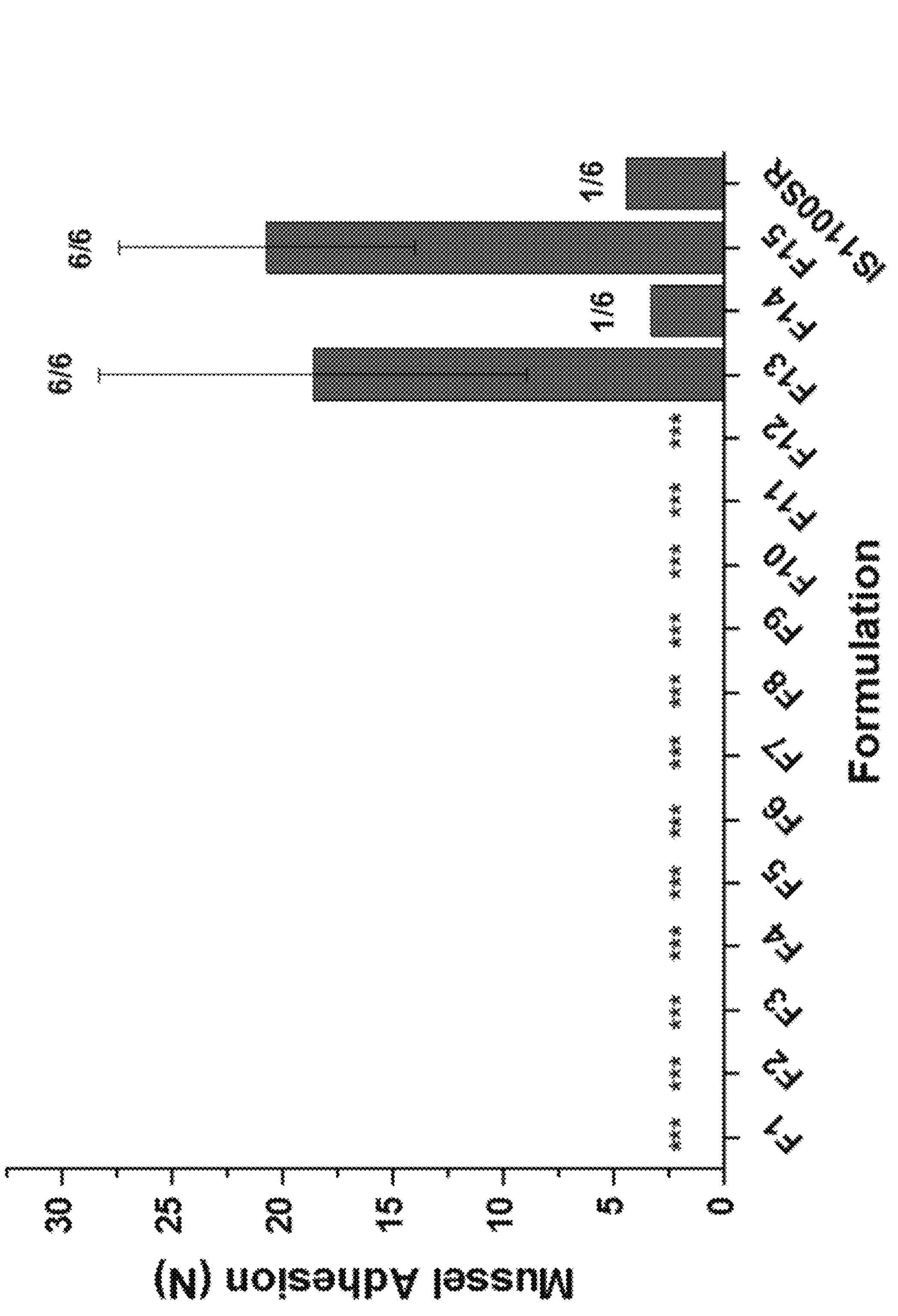
FIG. 21 shows the marine mussel *G. demissa* 3-day attachment and adhesion for compositions F1-F15 and control coating IS1100SR represented as force (N) required to pull mussels off coatings. *** represents no mussels attaching to the surface of the coatings. The top number in the fractions above bars represents the number of mussels attaching out of 6 available mussels.

As shown in FIG. 21, F1-F12 did not have any mussels attach to their surfaces regardless of PDMS:mPEG pre-polymer composition, or the amount of SMAA incorporated into the coating. The only poor performing coatings were that of 20 wt. % mPEG pre-polymer compositions. This dominant hydrophilic component is favorable for mussel attachment and is to be expected. Unfortunately, the SMAA did not have any consistent effect in deterring attachment, with the surfaces remaining largely mPEG dominant.

Figure 22:
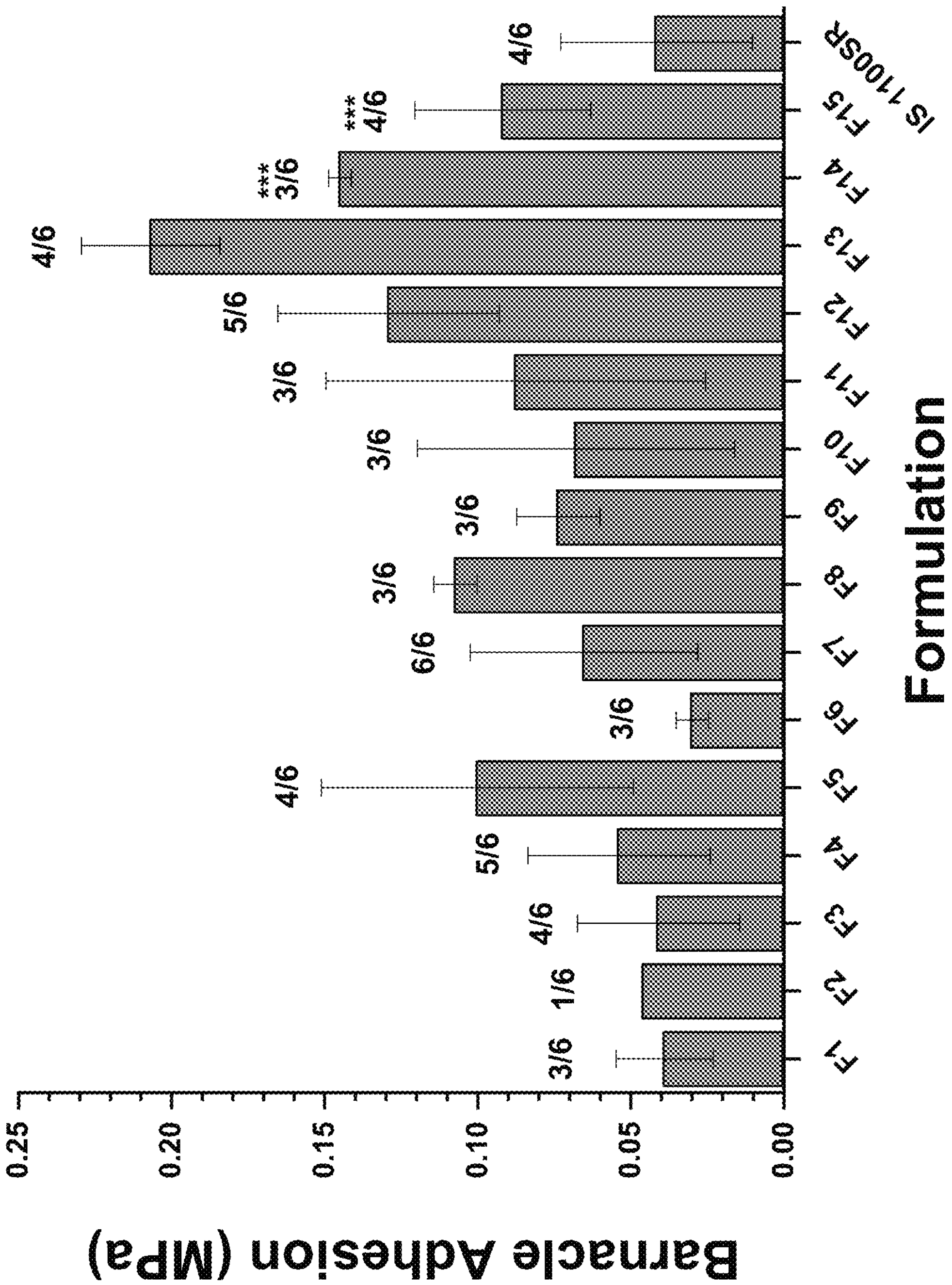
FIG. 22 shows the *A. amphitrite* 2-week barnacle reattachment and adhesion for compositions F1-F15 and control coating IS1100SR represented as force (MPa) required to push barnacles off coatings. The numerator on the fraction above the bars represents the number of barnacles attached, whilst the denominator represents the total number of available barnacles.

In FIG. 22, the 2-week barnacle reattachment and removal of *A. amphitrite* on selected compositions is shown. Typically, there is much variation associated with this type of assay performed using live barnacles. This can be problematic in differentiating between substrates that have higher or lower settlement and removal values, but some inferences can still be made. Overall, there were several compositions, such as F1-F4, F6, and F7, that had comparable, and, in some cases, lower adhesion values than commercial standard IS1100SR. These compositions had higher percentages of PDMS compared to mPEG in the pre-polymer composition, which typically produces surfaces that reduce barnacle adhesion strength. As expected, the compositions with higher mPEG percentages (F10-F15) in the pre-polymer had much higher barnacle adhesion values, as well as broken basal plates that often signify a strong adhesion to the substrate. Lastly, the addition of SMAA did not seem to affect the barnacle settlement and removal values for all compositions except for F2, F14, and F15. The coating system in F2 allowed only 1 barnacle to attach when 5 wt. % SMAA was incorporated into a 20:0 PDMS:mPEG pre-polymer composition coatings system. This could be due to the small concentration of mPEG being at the surface, providing a more heterogenous surface thought to disrupt barnacle adhesive proteins. Likewise, in F14 and F15, the addition of 5 and 10 wt. % of SMAA respectively reduced the barnacle adhesion values.

REFERENCES

1. Yebra, D. M.; Kiil, S. K.; Dam-Johansen, K., Antifouling Technology—Past, Present and Future Steps Towards Efficient and Environmentally Friendly Antifouling Coatings. *Prog. Org. Coat.* 2004, 50 (2), 75.
2. Hellio, C.; Yebra, D. M., *Advances in Marine Antifouling Coatings and Technologies.* 2009.
3. Lejars, M.; Margaillan, A.; Bressy, C., Fouling Release Coatings: A Nontoxic Alternative to Biocidal Antifouling Coatings. *Chem. Rev.* 2012, 112 (8), 4347.
4. Callow, J. A.; Callow, M. E., Trends in the Development of Environmentally Friendly Fouling-Resistant Marine Coatings. *Nat. Commun.* 2011, 2, 244.
5. Schultz, M. P.; Bendick, J. A.; Holm, E. R.; Hertel, W. M., Economic Impact of Biofouling on a Naval Surface Ship. *Biofouling* 2011, 27 (1), 87.
6. Callow, M. E.; Callow, J. A., Marine Biofouling: A Sticky Problem. *Biologist* 2002, 49 (1), 10.
7. Genzer, J.; Efimenko, K., Recent Developments in Superhydrophobic Surfaces and Their Relevance to Marine Fouling: A Review. *Biofouling* 2006, 22 (5), 339.
8. Konstantinou, I. K.; Albanis, T. A., Worldwide Occurrence and Effects of Antifouling Paint Booster Biocides in the Aquatic Environment: A Review. *Environ. Int.* 2004, 30 (2), 235.
9. Majumdar, P.; Ekin, A.; Webster, D. C., Thermoset Siloxane—Urethane Fouling Release Coatings. ACS Publications: 2007.
10. Webster, D. C.; Ekin, A., Functionalized polysiloxane polymers. Google Patents: 2010.
11. Webster, D. C.; Pieper, R. J.; Ekin, A., Thermoset siloxane-urethane fouling release coatings. Google Patents: 2011.
12. Bodkhe, R. B.; Thompson, S. E. M.; Yehle, C.; Cilz, N.; Daniels, J.; Stafslien, S. J.; Callow, M. E.; Callow, J. A.; Webster, D. C., The Effect of Formulation Variables on Fouling-Release Performance of Stratified Siloxane-Polyurethane Coatings. *Journal of Coatings Technology Research* 2012, 9 (3), 235.
13. Iguerb, O.; Poleunis, C.; Mazéas, F.; Compere, C.; Bertrand, P., Antifouling Properties of Poly(methyl methacrylate) Films Grafted with Poly(ethylene glycol) Monoacrylate Immersed in Seawater. *Langmuir* 2008, 24 (21), 12272-12281.
14. Feng, S.; Wang, Q.; Gao, Y.; Huang, Y.; Qing, F. L., Synthesis and characterization of a novel amphiphilic copolymer capable as anti-biofouling coating material. *Journal of applied polymer science* 2009, 114 (4), 2071-2078.
15. Bodkhe, R. B.; Stafslien, S. J.; Cilz, N.; Daniels, J.; Thompson, S. E. M.; Callow, M. E.; Callow, J. A.; Webster, D. C., Polyurethanes with amphiphilic surfaces made using telechelic functional PDMS having orthogonal acid functional groups. *Progress in Organic Coatings* 2012, 75 (1), 38-48.
16. Krishnan, S.; Wang, N.; Ober, C. K.; Finlay, J. A.; Callow, M. E.; Callow, J. A.; Hexemer, A.; Sohn, K. E.; Kramer, E. J.; Fischer, D. A., Comparison of the Fouling Release Properties of Hydrophobic Fluorinated and Hydrophilic Pegylated Block Copolymer Surfaces: Attachment Strength of the Diatom Navicula and the Green Alga Ulva. *Biomacromolecules* 2006, 7 (5), 1449.
17. Martinelli, E.; Menghetti, S.; Galli, G.; Glisenti, A.; Krishnan, S.; Paik, M. Y.; Ober, C. K.; Smilgies, D. M.; Fischer, D. A., Surface engineering of styrene/PEGylated-fluoroalkyl styrene block copolymer thin films. *Journal of Polymer Science* Part A: Polymer Chemistry 2009, 47 (1), 267-284.
18. Weinman, C. J.; Finlay, J. A.; Park, D.; Paik, M. Y.; Krishnan, S.; Sundaram, H. S.; Dimitriou, M.; Sohn, K. E.; Callow, M. E.; Callow, J. A., ABC triblock surface active block copolymer with grafted ethoxylated fluoroalkyl amphiphilic side chains for marine antifouling/fouling-release applications. *Langmuir* 2009, 25 (20), 12266-12274.
19. Martinelli, E.; Suffredini, M.; Galli, G.; Glisenti, A.; Pettitt, M. E.; Callow, M. E.; Callow, J. A.; Williams, D.; Lyall, G., Amphiphilic block copolymer/poly (dimethylsiloxane)(PDMS) blends and nanocomposites for improved fouling-release. Biofouling 2011, 27 (5), 529-541.
20. Zhu, X.; Guo, S.; Jańczewski, D.; Parra Velandia, F. J.; Teo, S. L.-M.; Vancso, G. J., Multilayers of fluorinated amphiphilic polyions for marine fouling prevention. *Langmuir* 2013, 30 (1), 288-296.
21. Gudipati, C. S.; Greenlief, C. M.; Johnson, J. A.; Prayongpan, P.; Wooley, K. L., Hyperbranched fluoropolymer and linear poly (ethylene glycol) based amphiphilic crosslinked networks as efficient antifouling coatings: an insight into the surface compositions, topographies, and morphologies. *Journal of Polymer Science Part A: Polymer Chemistry* 2004, 42 (24), 6193-6208.
22. Gudipati, C. S.; Finlay, J. A.; Callow, J. A.; Callow, M. E.; Wooley, K. L., The antifouling and fouling-release perfomance of hyperbranched fluoropolymer (HBFP)-poly (ethylene glycol)(PEG) composite coatings evaluated by adsorption of biomacromolecules and the green fouling alga Ulva. *Langmuir* 2005, 21 (7), 3044-3053.
23. Martinelli, E.; Hill, S. D.; Finlay, J. A.; Callow, M. E.; Callow, J. A.; Glisenti, A.; Galli, G., Amphiphilic modified-styrene copolymer films: Antifouling/fouling release properties against the green alga Ulva linza. *Progress in Organic Coatings* 2016, 90, 235-242.
24. Rufin, M. A.; Ngo, B. K. D.; Barry, M. E.; Page, V. M.; Hawkins, M. L.; Stafslien, S. J.; Grunlan, M. A., Antifouling silicones based on surface-modifying additive amphiphiles. *Green Materials* 2017, 5 (1), 4-13.
25. Galhenage, T. P.; Webster, D. C.; Moreira, A. M. S.; Burgett, R. J.; Stafslien, S. J.; Vanderwal, L.; Finlay, J. A.; Franco, S. C.; Clare, A. S., Poly (ethylene) glycol-modified, amphiphilic, siloxane-polyurethane coatings and their performance as fouling-release surfaces. *Journal of Coatings Technology and Research* 2017, 14 (2), 307-322.
26. Callow, M. E.; Callow, J. A.; Conlan, S.; Clare, A. S.; Stafslien, S., Efficacy testing of nonbiocidal and fouling-release coatings. *Biofouling methods* 2014, 291-316.
27. Stafslien, S. J.; Bahr, J. A.; Daniels, J. W.; Wal, L. V.; Nevins, J.; Smith, J.; Schiele, K.; Chisholm, B., Combinatorial materials research applied to the development of new surface coatings VI: An automated spinning water jet apparatus for the high-throughput characterization of fouling-release marine coatings. *Review of Scientific Instruments* 2007, 78 (7), 072204.

28. Cassé, F.; Stafslien, S. J.; Bahr, J. A.; Daniels, J.; Finlay, J. A.; Callow, J. A.; Callow, M. E., Combinatorial Materials Research Applied to the Development of New Surface Coatings V. Application of a Spinning Water-Jet for the Semi-High Throughput Assessment of the Attachment Strength of Marine Fouling Algae. *Biofouling* 2007, 23 (2), 121.
29. Casse, F.; Ribeiro, E.; Ekin, A.; Webster, D. C.; Callow, J. A.; Callow, M. E., Laboratory Screening of Coating Libraries for Algal Adhesion. *Biofouling* 2007, 23 (4), 267.
30. Stafslien, S.; Daniels, J.; Bahr, J.; Chisholm, B.; Ekin, A.; Webster, D.; Orihuela, B.; Rittschof, D., An Improved Laboratory Reattachment Method for the Rapid Assessment of Adult Barnacle Adhesion Strength to Fouling-Release Marine Coatings. *Journal of Coatings Technology and Research* 2012, 9 (6), 651.
31. Rittschof, D.; Orihuela, B.; Stafslien, S.; Daniels, J.; Christianson, D.; Chisholm, B.; Holm, E., Barnacle Reattachment: A Tool for Studying Barnacle Adhesion. *Biofouling* 2008, 24 (1), 1.

The claimed invention is:

1. A curable coating composition comprising:

a) at least one surface modifying amphiphilic additive (SMAA), comprising the reaction product of:
  a1) at least one Si-H functional siloxane; and
  a2) at least one allyl-functional poly (ethylene glycol) methyl ether (allyl-functional mPEG);
b) at least one polyisocyanate;
c) at least one polyol; and
d) at least one amphiphilic mPEG-polydimethylsiloxane (PDMS) isocyanate pre-polymer, comprising the reaction product of:
  d1 at least one polyisocyanate;
  d2) at least one monocarbinol-terminated PDMS; and
  d3) at least one poly (ethylene glycol) methyl ether (mPEG), wherein the at least one amphiphilic mPEG-PDMS isocyanate prepolymer, d), has an overall isocyanate to total hydroxyl equivalent ratio such that isocyanate is in excess, and wherein the SMAA, a), has the following structure:

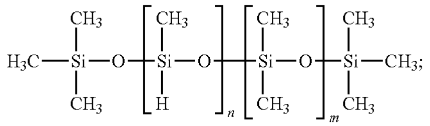

wherein:
X is

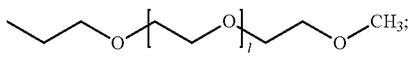

l ranges from 5 to 6;
m ranges from 0 to 13; and
n ranges from 2 to 18.

2. The curable coating composition of claim 1, wherein the SMAA, a), is present in an amount ranging from about 0.1-40 wt. %, based on the solid content of the curable coating composition.

3. The curable coating composition of claim 1, wherein the Si—H functional siloxane, a1), and the allyl-functional mPEG, a2), are reacted in a 1.0:1.0 molar equivalent ratio.

4. The curable coating composition of claim 1, wherein the Si—H functional siloxane, a1), has the following structure:

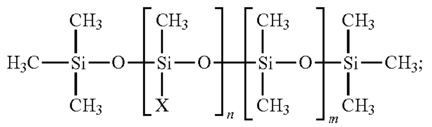

wherein:

m ranges from 0 to 13; and n ranges from 2 to 18.

5. The curable coating composition of claim 1, wherein the Si—H functional siloxane, a1), is selected from the group consisting of a 100 mol % Si—H polymethylhydrosiloxane, a copolymer of methylhydrosiloxane-dimethylsiloxane of varying mol % Si—H, a tetra functional Si—H cyclosiloxane, and mixtures thereof.

6. The curable coating composition of claim 1, wherein the polyisocyanate, b) and d1), are, independent of one another, selected from the group consisting of an aliphatic polyisocyanate, a cycloaliphatic polyisocyanate, an araliphatic polyisocyanate, an aromatic polyisocyanate, and mixtures thereof.

7. The curable coating composition of claim 6, wherein the polyisocyanate, b) and d1), are, independent of one another, selected from the group consisting of:

(I)

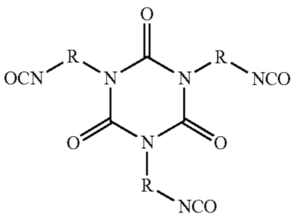

(II)

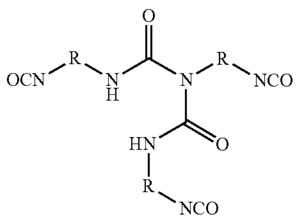

wherein R is independently divalent $C_1$-$C_{15}$ alkyl, $C_3$-$C_{15}$ cycloalkyl, or a group selected from:

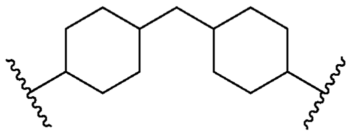,
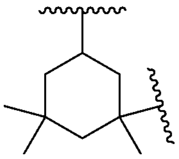,

-continued

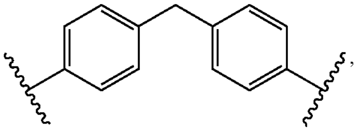,

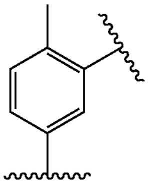,

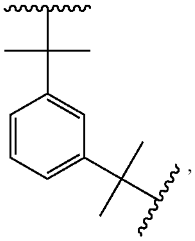, and

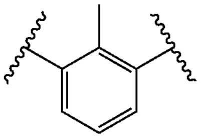.

8. The curable coating composition of claim 6, wherein the polyisocyanate, b) and d1), are isophorone diisocyanate and trimers thereof.

9. The curable coating composition of claim 1, wherein the polyol, c), is selected from the group consisting of a polyester polyol, a polyether polyol, a polycarbonate polyol, an acrylic polyol, and mixtures thereof.

10. The curable coating composition of claim 9, wherein the polyol, c), is selected from an acrylic polyol.

11. The curable coating composition of claim 1, wherein the isocyanate to total hydroxyl equivalent ratio in the amphiphilic mPEG-PDMS isocyanate prepolymer, d), ranges from 1.5:1 to 1.1:1.

12. The curable coating composition of claim 1, wherein the at least one amphiphilic mPEG-PDMS isocyanate prepolymer, d), contains monocarbinol-terminated PDMS, d2): mPEG, d3) in a ratio ranging from 0.1:20 wt. % to 20:0.1 wt. %, based on the solid content of the amphiphilic mPEG-PDMS isocyanate prepolymer, d).

13. The curable coating composition of claim 1, wherein the monocarbinol-terminated PDMS, d2), has the following structure:

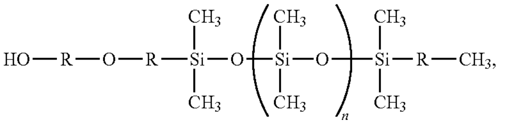, or

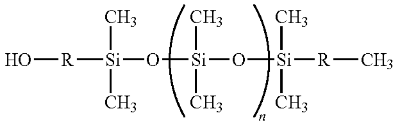

wherein R, independent of one another, is a $C_3$-$C_{12}$ straight chain alkyl or an alkylene ether;

wherein n ranges from 0 to about 270.

14. A cured coating composition comprising the curable coating composition of claim 1.

15. An object coated with the curable coating composition of claim 1.

16. A method for reducing or preventing biofouling of a surface exposed to an aqueous environment comprising the steps of:

coating at least a portion of the surface with a curable coating composition of claim 1 to form a coated surface, and curing the coating composition on the coated surface.

17. A marine fouling-release coating comprising the curable coating composition of claim 1.

* * * * *